(12) United States Patent
Robinson et al.

(10) Patent No.: US 11,713,528 B2
(45) Date of Patent: Aug. 1, 2023

(54) TEXTILE RECYCLING

(71) Applicant: Apani Systems Inc., Redmond, WA (US)

(72) Inventors: Emily Grace Robinson, Blaine, WA (US); Scot E Land, Redmond, WA (US)

(73) Assignee: APANI SYSTEMS INC., Redmond, WA (US)

( * ) Notice: Subject to any disclaimer, the term of this patent is extended or adjusted under 35 U.S.C. 154(b) by 0 days.

(21) Appl. No.: 17/823,914

(22) Filed: Aug. 31, 2022

(65) Prior Publication Data
US 2023/0069369 A1    Mar. 2, 2023

Related U.S. Application Data

(60) Provisional application No. 63/239,274, filed on Aug. 31, 2021.

(51) Int. Cl.
*B01D 37/00* (2006.01)
*B01D 43/00* (2006.01)
(Continued)

(52) U.S. Cl.
CPC ............... *D06B 9/00* (2013.01); *B07C 5/3422* (2013.01); *B07C 5/361* (2013.01); *C08J 11/08* (2013.01);
(Continued)

(58) Field of Classification Search
CPC ........ B01D 37/00; B01D 43/00; B07C 5/342; B07C 5/3422; B07C 5/361; D01D 4/02;
(Continued)

(56) References Cited

U.S. PATENT DOCUMENTS 1,389,517 A * 8/1921 Kitsee ..................... D01D 5/18
264/103
1,877,337 A * 9/1932 Kampf ..................... D01F 2/08
96/219
(Continued)

FOREIGN PATENT DOCUMENTS

CN        103388188 A      11/2013
CN        108130608 A       6/2018
(Continued)

OTHER PUBLICATIONS

Translation of CN-108728923-A (published on Nov. 2, 2018).*
(Continued)

*Primary Examiner* — Leo B Tentoni
(74) *Attorney, Agent, or Firm* — 24HourIP, PLLC

(57) ABSTRACT

A textile recycling method receives textile-waste-to-be-recycled, sorts the waste to isolate cellulose-containing articles from non-cellulose-containing articles, and re-sizes at least some of the cellulose-containing articles to create feedstock. The feedstock is processed in a cellulose solvent reactor, which has at least one ionic liquid. The ionic liquid dissolves intermolecular cellulose bonds of the feedstock to create a spinning dope. Cellulose fibers dissolved in the cellulose-bearing spinning dope solution are extruded in a cellulose coagulation bath reservoir to reconstitute at least some of the cellulose fibers, and the reconstituted fibers are wet-spun to form a continuous cellulose thread that is commercially indistinguishable from virgin fiber thread. Synthetic fiber material is vacuum-extracted or mechanically extracted from the cellulose-bearing solution and recycled into a continuous synthetic thread. Original color of textile-waste-to-be-recycled can be retained or removed, and new color can be added.

19 Claims, 6 Drawing Sheets

(51) Int. Cl.
| | |
|---|---|
| *B07C 5/342* | (2006.01) |
| *D01D 4/02* | (2006.01) |
| *D01D 13/00* | (2006.01) |
| *D01D 13/02* | (2006.01) |
| *D01F 1/06* | (2006.01) |
| *D01F 1/07* | (2006.01) |
| *D01F 1/10* | (2006.01) |
| *D01F 2/02* | (2006.01) |
| *D21C 7/00* | (2006.01) |
| *D21C 7/12* | (2006.01) |
| *D06B 9/00* | (2006.01) |
| *C08J 11/08* | (2006.01) |
| *D01D 1/02* | (2006.01) |
| *D01D 5/06* | (2006.01) |
| *D01F 2/00* | (2006.01) |
| *B07C 5/36* | (2006.01) |

(52) U.S. Cl.
CPC .............. *D01D 1/02* (2013.01); *D01D 5/06* (2013.01); *D01F 2/00* (2013.01); *C08J 2301/02* (2013.01); *D10B 2201/22* (2013.01); *Y02W 30/66* (2015.05)

(58) Field of Classification Search
CPC .......... D01D 5/06; D01D 13/00; D01D 13/02; D01F 1/06; D01F 1/07; D01F 1/10; D01F 2/02; D10B 2201/22; D21C 7/00; D21C 7/12
USPC .... 264/101, 102, 140, 169, 178 F, 187, 211, 264/914; 425/71, 135, 143, 197, 202, 425/204, 382.2, 464, 812; 162/238, 252, 162/263; 209/576, 579
See application file for complete search history.

(56) References Cited

U.S. PATENT DOCUMENTS

| | | | | |
|---|---|---|---|---|
| 5,354,524 A | * | 10/1994 | Sellars ................. | D01F 2/00 264/187 X |
| 2009/0096962 A1 | * | 4/2009 | Shelton ................. | C08B 3/18 252/589 |
| 2010/0282647 A1 | * | 11/2010 | Miller ................. | B07B 11/06 209/129 |
| 2014/0093917 A1 | * | 4/2014 | Zhang ................. | C13K 13/002 162/73 |
| 2019/0136415 A1 | * | 5/2019 | Chen ................. | D01D 5/06 |
| 2020/0349491 A1 | | 11/2020 | Klaus-Nietrost | |
| 2021/0054567 A1 | * | 2/2021 | Flynn ................. | D21H 15/10 |

FOREIGN PATENT DOCUMENTS

| | | | | |
|---|---|---|---|---|
| CN | 108728923 A | * | 11/2018 | ............... D01F 2/08 |
| CN | 112442747 A | | 3/2021 | |
| JP | 2021-511447 A | | 5/2021 | |
| WO | 2014/162062 A1 | | 10/2014 | |
| WO | 2017/019802 A1 | | 2/2017 | |
| WO | 2018/138416 A1 | | 2/2018 | |
| WO | 2018/083383 A1 | | 5/2018 | |
| WO | 2018/115584 A1 | | 6/2018 | |
| WO | 2018/142025 A1 | | 9/2018 | |
| WO | 2018/229342 A1 | | 12/2018 | |
| WO | 2019/077208 A1 | | 4/2019 | |
| WO | 2019/155116 A1 | | 8/2019 | |
| WO | 2020/094927 A1 | | 5/2020 | |
| WO | 2021/053272 A1 | | 3/2021 | |

OTHER PUBLICATIONS

Bento, R. M., Almeida, M. R., Bharmoria, P Freire, M. G and Tavares, A. P.; "Improvements in the enzymatic degradation of textile dyes using ionic-liquid-based surfactants"; Mar. 18, 2020; in Separation and Purification Technology; 235, 116191. DOI: 10.1016/j. seppur.2019.116191 (2020).

Seoud, O. A. E., Kostag, M., Jedvert, K., and Malek, N. I.; "Cellulose Regeneration and Chemical Recycling Closing the "Cellulose Gap" Using Environmentally Benign Solvents"; Feb. 25, 2020; in Macromolecular Materials and Engineering, 305(4), 1900832. DOI: 10.1002/mame.201900832.

Rieland, J. M. and Love, B. J.; "Ionic liquids: A milestone on the pathway to greener recycling of cellulose from biomass"; Jan. 9, 2020; in Resources, Conservation and Recycling; 155, 104678. DOI: 10.1016/j.resconrec.2019.104678 (2020).

Ma, Y., Rosson, L., Wang, X., and Byrne, N.; "Upcycling of waste textiles into regenerated cellulose fibres: impact of pretreatments"; Aug. 26, 2019 [Don'T Have This One Yet]; in The Journal of the Textile Institute; 111(5), 330-638. DOI: 10.1080/00405000.2019. 1656355 (2019).

Ma, Y., Zeng, B., Wang, X., and Byrne, N.; "Circular Textiles: Closed Loop Fiber to Fiber Wet Spun Process for Recycling Cotton from Denim"; May 28, 2019; in ACS Sustainable Chemistry & Engineering; DOI: 10.1021/acssuschemeng.8b06166 (2019).

Wedin, H., Lopes, M., Sixta, H., and Hummel, M.; "Evaluation of post-consumer cellulosic textile waste for chemical recycling based on cellulose degree of polymerization and molar mass distribution"; Mar. 13, 2019; in Textile Research Journal; 89(23-24), 5067-5075. DOI: 10.1177/0040517519848159 (2019).

Harmanutz, F., Vocht, M. P., Panzier, N., and Buchmeiser, M. R.; "Processing of Cellulose Using Ionic Liquids"; Nov. 15, 2018; in Macromolecular Materials and Engineering; 304(2), 1800450. DOI: 10.1002/mame.201800450 (2018).

Shuhua, W., Xiaoying, Y., Xiaogang, C., Wensheng, H., and Mei, N.; "Recycling of Cotton Fibers Separated from the Waste Blend Fabric"; Oct. 23, 2018 [ Don'T Have This One Yet]; in Journal of Natural Fibers; 17(4), 520-531. DOI: 10.1080/15440478.2018. 1503130 (2018).

Haslinger, S., Hummel, M Anghelescu-Hakala, A., Maattanen, M., and Sixta, H.; "Upcycling of cotton polyester blended textile waste to new man-made cellulose fibers"; Aug. 5, 2019; in Waste Management; 97, 88-96. DOI: 10.1016/j.wasman.2019.07.040 (2019).

"Textiles: Material-Specific Data. EPA, Environmental Protection Agency"; Mar. 2018; retrieved from: www.epa.gov/facts-and-figures-about-materials-waste-and-recycling/textiles-material-specific-data on Oct. 30, 2019 and refreshed on Aug. 31, 2022.

Silva, R. D., Wang, X., and Byrne, N.; "Recycling textiles: the use of ionic liquids in the separation of cotton polyester blends"; Jun. 19, 2014; in RSC Adv.,; 4(55), 29094-29098. DOI: 10.1039/c4ra04306e (2014).

"Cellulose strand"; May 21, 2013; retrieved from: https://commons. wikimedia.org/wiki/ as the file: "Cellulose_strand.svg" on Sep. 1, 2020.

Salvia, Giuseppe, Zimmerman, Nici, Willan, Catherine, Hale, Hoanna, Gitau, Hellen, Muindi Kanyiva, Gichana, Evans, Davies, Mike; "The wicked problem of waste management: An attention-based analysis of stakeholder behaviours"; Sep. 30, 2021; in Journal of Cleaner Production; available at https://doi.org/10.1016/j.clepro. 2021.129200.

Cao, Zhengnan, Han, Xiaoqing, Lyons, William, O'Rourke, Fergal; "Energy management optimisation using a combined Long Short-Term Memory recurrent neural network—Particle Swarm Optimisation model"; Oct. 7, 2021; in Journal of Cleaner Production; available at https://doi.org/10.1016/j.jclepro.2021.129246.

Ribul, Miriam, Lanot, Alexandra, Pisapia, Chiara Tommencioni, Purnell, Phil, McQueen-Mason, Simon J., Baurley, Sharon; "Mechanical, chemical, biological: Moving towards closed-loop bio-based recycling in a circular economy of sustainable textiles"; Oct. 9, 2021; in Journal of Cleaner Production; available at https://doi.org/ 10.1016/j.jclepro.2021.129325.

Martinez, R., Ruiz, M.O., Ramos, C., Camara, J.M., Diez, V.; "Fouling control of submerged and side-stream membrane bioreactors based on the statistical analysis of mid-term assays"; Oct. 11, 2021; in Journal of Cleaner Production; available at https://doi.org/ 10.1016/j.jclepro.2021.129336.

(56) References Cited

OTHER PUBLICATIONS

Amini, Elahe, Valls, Cristina, Roncero, M. Blanca; "Ionic liquid-assisted bioconversion of lignocellulosic biomass for the development of value-added products"; Oct. 11, 2021; in Journal of Cleaner Production; available at https://doi.org/10.1016/j.jclepro.2021.129275.

Coudard, A., Corbin, E., De Koning, J., Tukker, A., Mogollon, J.M.; "Global water and energy losses from consumer avoidable food waste"; Oct. 11, 2021; in Journal of Cleaner Production; available at https://doi.org/10.1016/j.jclepro.2021.129342.

Kok, Anne Linda, Barendregt, Wolmet; "Understanding the adoption, use, and effects of ecological footprint calculators among Dutch citizens"; Oct. 16, 2021; in Journal of Cleaner Production; available at https://doi.org/10.1016/j.jclepro.2021.129341.

\* cited by examiner

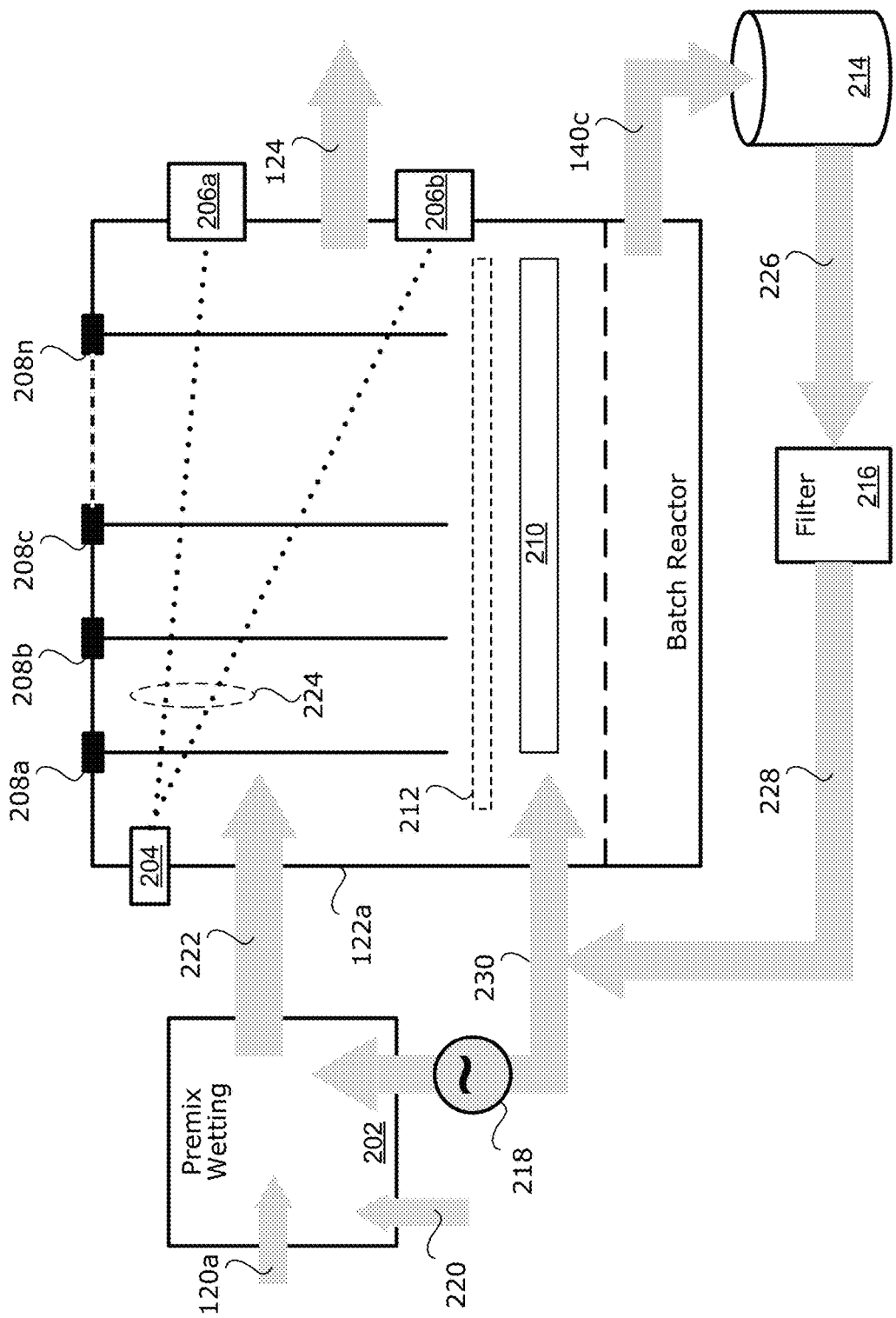

TEXTILE RECYCLING

CROSS-REFERENCE TO RELATED APPLICATIONS

This application claims the priority benefit of U.S. Provisional Patent Application No. 63/239,274, filed Aug. 31, 2021, which application is hereby incorporated by reference in its entirety.

BACKGROUND

Technical Field

The present disclosure generally relates to textile recycling. More particularly, but not exclusively, the present disclosure relates to reclamation of components such as cellulose fibers from manufactured materials via ionic liquids.

Description of the Related Art

According to the United States Environmental Protection Agency (EPA), the United States produces 25 billion pounds per year of textile waste. Of this waste, only fifteen percent (15%) is currently reused, and of this reused waste, about fourteen percent (14%) is downcycled (e.g., for use in mattresses, seat cushion stuffing, and the like), and about one percent (1%) is chemically recycled. Textile waste is estimated to occupy about eight percent (8%) of total landfill mass.

Polyester/cotton blends are known to represent a large portion of textiles on the market. As recently as 2019, the EPA has estimated that demand for textile fibers will rise at the rate of three percent (3%) per year. The amount of generated textile waste that ends up in landfills is significant. Currently, cotton/polyester blends are recycled using processes that include either depolymerization or dissolution of one of the components. Some common industry methods subject polyester to alcoholysis, hydrolysis, or glycolysis reactions. Other common industry methods degrade cellulose under acidic conditions. Dimethyl sulfoxide (DMSO) is a common solvent currently used in the dissolution of polyester. DMSO, however, is toxic to humans and other animals, it requires high temperatures (e.g., over 150 degrees Celsius), and DMSO also influences the properties of the remaining cellulose component.

One less toxic method of recycling cotton/polyester blends currently used in industry is to subject the material to hydrochloric acid. Hydrochloric acid hydrolyzes cotton and generates a microcrystalline powder. The microcrystalline powder can then be separated from the polyester fibers, which allows the polyester fibers to be respun. In this process, a substantial portion of the cotton is wasted.

Some aspects of technologies and related art that may be useful in understanding the background of the present disclosure are described in the following publications:

published PCT patent application WO 2018/115584 A1, which describes a method of separating cellulose and polyester from a material blend with a first portion of superbase-based ionic liquid;

an article entitled "Ionic liquids: A milestone on the pathway to greener recycling of cellulose from biomass", by Rieland, J. M. and Love, B. J. in Resources, Conservation and Recycling, 155, 104678. DOI: 10.1016/j.resconrec. 2019.104678 (2020);

an article entitled "Recycling textiles: the use of ionic liquids in the separation of cotton polyester blends" by Silva, R. D., Wang, X., and Byrne, N. in RSC Adv., 4(55), 29094-29098. DOI: 10.1039/c4ra04306e (2014);

an article entitled "Recycling of Cotton Fibers Separated from the Waste Blend Fabric" by Shuhua, W., Xiaoying, Y., Xiaogang, C., Wensheng, H., and Mei, N. in Journal of Natural Fibers, 17(4), 520-531. DOI: 10.1080/15440478.2018.1503130 (2018);

an article entitled "Improvements in the enzymatic degradation of textile dyes using ionic-liquid-based surfactants" by Bento, R. M., Almeida, M. R., Bharmoria, P., Freire, M. G., and Tavares, A. P. in Separation and Purification Technology, 235, 116191. DOI: 10.1016/j.seppur.2019.116191 (2020);

an article entitled "Processing of Cellulose Using Ionic Liquids" by Hermanutz, F., Vocht, M. P., Panzier, N., and Buchmeiser, M. R. in Macromolecular Materials and Engineering, 304(2), 1800450. DOI: 10.1002/mame.201800450 (2018);

an article entitled "Upcycling of waste textiles into regenerated cellulose fibres: impact of pretreatments" by Ma, Y., Rosson, L., Wang, X., and Byrne, N. in The Journal of The Textile Institute, 111(5), 630-638. DOI: 10.1080/00405000.2019.1656355 (2019);

an article entitled "Evaluation of post-consumer cellulosic textile waste for chemical recycling based on cellulose degree of polymerization and molar mass distribution" by Wedin, H., Lopes, M., Sixta, H., and Hummel, M. in Textile Research Journal, 89(23-24), 5067-5075. DOI: 10.1177/0040517519848159 (2019);

an article entitled "Circular Textiles: Closed Loop Fiber to Fiber Wet Spun Process for Recycling Cotton from Denim" by Ma, Y., Zeng, B., Wang, X., and Byrne, N. in ACS Sustainable Chemistry & Engineering. DOI: 10.1021/acssuschemeng.8b06166 (2019);

an article entitled "Cellulose Regeneration and Chemical Recycling: Closing the "Cellulose Gap" Using Environmentally Benign Solvents" by Seoud, O. A. E., Kostag, M., Jedvert, K., and Malek, N. I. in Macromolecular Materials and Engineering, 305(4), 1900832. DOI: 10.1002/mame.201900832 (2020);

an article entitled "Upcycling of cotton polyester blended textile waste to new man-made cellulose fibers" by Haslinger, S., Hummel, M., Anghelescu-Hakala, A., Määttänen, M., and Sixta, H. in Waste Management, 97, 88-96. DOI: 10.1016/j.wasman.2019.07.040 (2019);

selected data published on the world-wide-web site www.epa.gov/facts-and-figures-about-materials-waste-and-recycling/textiles-material-specific-data and bearing a title "Textiles: Material-Specific Data. EPA, Environmental Protection Agency" on Oct. 30, 2019; and selected data published on the world-wide-web site https://commons.wikimedia.org/wiki/File:Cellulose_strand.svg and bearing the title "Cellulose strand" on Sep. 1, 2020.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventors' approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) enable energy efficient, environmentally beneficial textile recycling.

In a first embodiment, a textile recycling method, includes: receiving textiles-to-be-recycled; re-sizing at least some of the cellulose-containing articles to create feedstock; processing the feedstock in a cellulose solvent reactor having at least one ionic liquid therein to create a spinning dope, wherein the processing includes dissolving, at least partially, some or all intermolecular cellulose bonds of the feedstock thereby creating a cellulose-bearing solution having cellulose fibers dissolved in the at least one ionic liquid; extracting the spinning dope in a cellulose coagulation bath reservoir to reconstitute at least some of the dissolved cellulose fibers; and wet-spinning at least some of the reconstituted cellulose fibers into a continuous cellulose thread.

In some cases of the first embodiment, the method also includes: vacuum-extracting or mechanically filtering insoluble materials from the cellulose solvent reactor; separating synthetic fiber material from the insoluble materials; and recycling the synthetic fiber material into a continuous synthetic thread.

In some cases of the first embodiment, the method also includes: adding at least one material to the feedstock, the material being at least one of a dye, an inert identification chemical, a water repellent, and a flame retardant. Sometimes, the method includes adding at least one material to the coagulation bath reservoir, the material being at least one of a dye, an inert identification chemical, a water repellent, and a flame retardant, and sometimes the method includes sorting the textiles-to-be-recycled to isolate the cellulose-containing articles from non-cellulose-containing articles. In these and other embodiments, the method includes sorting the textiles-to-be-recycled to isolate a second type of cellulose-containing articles, wherein the cellulose-containing articles have a first type of cellulose fiber and the second type of cellulose-containing articles have a second type of cellulose fiber, the first type of cellulose fiber being different from the second type of cellulose fiber; re-sizing at least some of the second type of cellulose-containing articles to create a second feedstock; processing the second feedstock in a second cellulose solvent reactor having at least one second ionic liquid therein to create a second spinning dope, wherein the processing the second feedstock includes dissolving, at least partially, some or all intermolecular cellulose bonds of the second feedstock thereby creating a second cellulose-bearing solution having second cellulose fibers dissolved in the at least one second ionic liquid; extracting the second spinning dope in a second cellulose coagulation bath reservoir to reconstitute at least some of the dissolved second cellulose fibers; and wet-spinning at least some of the reconstituted cellulose fibers with at least some of the reconstituted second cellulose fibers into a continuous cellulose hybrid thread.

In some cases of the first embodiment, the method also includes: based on the sorting, directing operation of at least one conveyor, gate, pump, valve, fan, motor, suction, filter, or timer. In these or other cases, the method also includes: based on the sorting, directing operation of at least one electronically controllable circuit. Sometimes in these cases, the method includes: initializing a computing controller, the computing controller arranged to direct operations of the textile recycling method. In still further cases, the cellulose solvent reactor is sometimes arranged as a plurality of reaction vessels and wherein processing the feedstock includes receiving a portion of the feedstock in each of the plurality of reaction vessels and creating a portion of the spinning dope in each of the plurality of reaction vessels.

In a second embodiment, a textile recycling system, includes: a textile preprocessing structure arranged to receive textiles-to-be-recycled, the textiles to be recycled having at least some cellulose-containing articles, and the textile preprocessing structure further arranged to re-size at least some of the cellulose-containing articles to create feedstock; a cellulose-solvent reactor arranged to receive the feedstock and at least one ionic liquid and further arranged to create a spinning dope from the feedstock and at least one ionic liquid by dissolving, at least partially, some or all intermolecular cellulose bonds of the feedstock thereby creating a cellulose-bearing solution having cellulose fibers dissolved in the at least one ionic liquid; a cellulose coagulation bath reservoir arranged to receive the cellulose-bearing solution and further arranged to extract the spinning dope by reconstituting at least some of the dissolved cellulose fibers; and a wet spinning spinneret subsystem arranged to wet-spin at least some of reconstituted cellulose fibers into a continuous cellulose thread.

In some cases of the second embodiment, the system includes a vacuum-extraction or mechanical filter subsystem arranged to withdraw insoluble materials from the cellulose solvent reactor. In some cases, the system includes a controller arranged direct operations of the cellulose solvent reactor. In these and other cases, the cellulose-solvent reactor further includes: a plurality of reaction vessels arranged for concurrent operation, wherein each of the plurality of reaction vessels is arranged to receive a portion of the feedstock and further arranged to create a portion of the spinning dope. And sometimes in these cases, each of the plurality of reaction vessels operates independently from others of the plurality of reaction vessels.

In a third embodiment, a cellulose-solvent reactor includes: a vessel arranged to contain a flowable feedstock slurry formed of ionic liquid and cellulose-containing feedstock; a control system arranged to determine a cellulose concentration of the flowable feedstock slurry; at least one transducer coupled to the control system and arranged to output electromagnetic energy into the vessel; at least one sensor coupled to the control system and arranged to provide data indicative of how much electromagnetic energy from the at least one transducer has passed through flowable feedstock slurry, and an output port formed in the vessel, the output port arranged to provide a spinning dope to a coagulation bath, wherein the spinning dope is formed when some or all intermolecular cellulose bonds of the flowable feedstock slurry are dissolved as cellulose fibers in the ionic liquid.

In some cases of the third embodiment, the cellulose-solvent reactor further comprises: a heating circuit arranged to heat the flowable feedstock slurry in the vessel. In some cases, the cellulose-solvent reactor further comprises: an agitation structure arranged to agitate the flowable feedstock slurry in the vessel. And in some other cases, the cellulose-solvent reactor further comprises: one or more reaction probes partially or completely arranged in the vessel, the one or more reaction probes arranged to generate at least one of pressure data, temperature data, and conductivity data indicative of the cellulose concentration of the flowable feedstock slurry. Sometimes, the cellulose-solvent reactor further comprises: a plurality of reaction vessels arranged for concurrent operation, wherein each of the plurality of reaction vessels is arranged to receive a portion of the flowable feedstock slurry and further arranged to create a portion of the spinning dope.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 2C is a first batch reactor in a unified textile recycling system embodiment.

Figure 1:
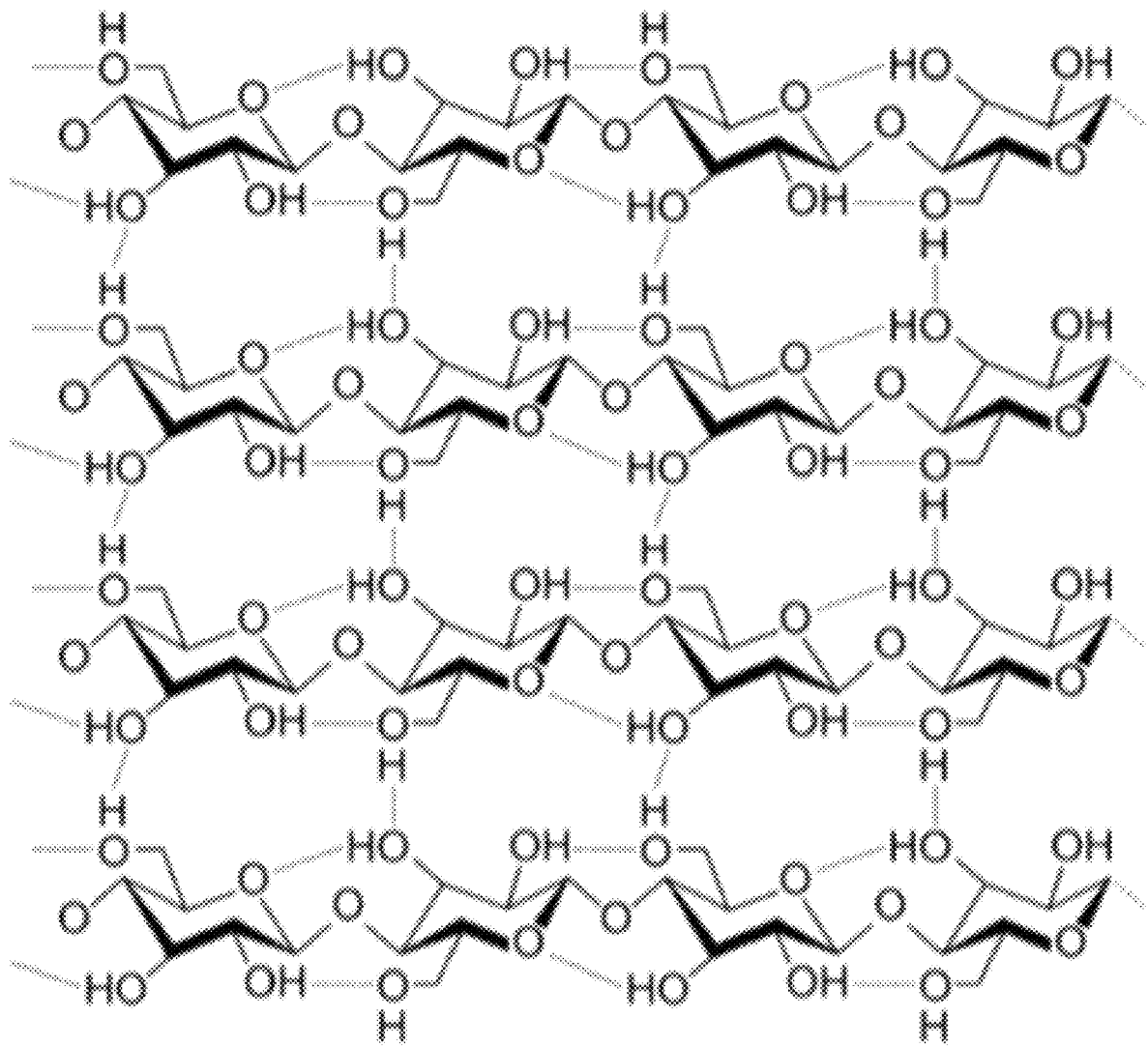
FIG. 1 is a schematic illustrating the molecular structure of cellulose in an embodiment of a cellulose chain.

In the present disclosure, for brevity, certain sets of related figures may be referred to as a single, multi-part figure to facilitate a clearer understanding of the illustrated subject matter. For example, FIGS. 2A-2D may be individually or collectively referred to as FIG. 2.

DETAILED DESCRIPTION

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, certain logic and other structures associated with the reclamation of raw materials of textiles such as vats, pumps, spinnerets, conveyors, wired and wireless communications protocols, wired and wireless transceivers, radios, communications ports, geolocation, and optimized process mapping algorithms have not been shown or described in detail to avoid unnecessarily obscuring more detailed descriptions of the embodiments. In these and other cases, well-known structures associated with computing systems, including client and server computing systems as well as networks, have not been shown or described in detail to avoid unnecessarily obscuring more detailed descriptions of the embodiments.

The device, method, and system embodiments described in this disclosure (i.e., the teachings of this disclosure) enable energy efficient, environmentally beneficial textile recycling. Textile waste is a global problem. Textile waste comprises a significant portion of landfill mass. Textile demand is increasing, which places demands on agriculture to produce more cotton. Industry standards of spinning and dyeing cotton fibers is hazardous and consumes large amounts of energy. The viscose method of wet spinning, which is a common industry method, uses large amounts of water, time, and energy.

Ionic liquids have been shown to dissolve organic matter such as cellulose fibers. Ionic liquids have also shown promise in separating waste polymer-cellulose textile blends. When the cellulose concentration is high enough, an ionic-liquid-cellulose solution can be wet spun to produce recycled fibers. The remaining non-cellulose polymer fibers can also be respun and possess characteristics competitive to virgin polyester fibers. Processes described in the present disclosure have been shown to preserve dyes, if desired, or remove the original coloring and produce neutral fibers, relieving industry strain in the dyeing process and saving time, water, and energy.

Based on United States Environmental Protection Agency (EPA) estimates that the United States produces 25 billion pounds per year of textile waste, and further based on estimates that only fifteen percent (15%) of this waste is currently reused, the study of cellulose regeneration from textile waste is important.

Textile waste is estimated to occupy about eight percent (8%) of total landfill mass. Polyester/cotton blends are known to represent a large portion of textiles on the market. The amount of generated polyester/cotton blend textile waste that ends up in landfills is significant. Additionally, cellulose fibers are increasingly being produced from wood in industry, which is creating a strain on international forest lands and landfill space. Regeneration of fibers from textile waste can meet future textile production needs and reduce overall textile waste.

Dyeing textiles is energy and water demanding. If regenerated fibers can retain their color, then the regeneration of fibers from textile waste can further reduce energy consumption in future textile production.

The present disclosure describes substantially or entirely environmentally benign methods of textile recycling that employ ionic liquids to dissolve the cotton component of certain textiles into cotton solutions. In some cases, the cotton solutions contain more than one half of one percent (0.5%) cotton. In some cases, the cotton solutions contain about one to two percent (1-2%) cotton. In other cases, the cotton solution contains more than two percent (2%) cotton. In still other cases, the cotton solution contains less than five percent (5%), less than ten percent (10%), less than twenty-five percent (25%), less than fifty percent (50%), or some other percentage less than one hundred percent (100%) cotton.

Once the cotton component of the cotton solution has been dissolved, these same environmentally benign methods, or different methods (e.g., mechanical separation such as vacuum filtration, centrifuging, and the like), may filter out or otherwise reclaim some or all of the polyester fibers. The reclaimed polyester fibers can then be respun.

In some cases, after removing (e.g., via filtering or some other method) some or all of the non-cellulose-containing content, the cotton solution may be further concentrated. The cotton solution may be concentrated to fifteen to seventeen percent (15-17%) cotton from stock fibers in some cases. Alternatively, or in addition, the cotton solution may be concentrated to more than five percent (5%), more than ten percent (10%), more than twenty-five percent (25%), and even more than fifty percent (50%) cotton from stock fibers, which allows the cotton fibers to be respun as well. It has been observed by the inventors that the reclaimed cotton and polyester fiber generated in this manner are indifferentiable from virgin fibers.

Improved optimization of ionic liquid methods to textile recycling include use of N-Methylmorpholine-N-oxide (NMMO), 1-Allyl-3-methylimidazolium chloride (AMIM-CL), or 1-butyl-3-methylimidazolium acetate (BMIM-OAc) to dissolve the cotton fibers from textile blends. In some cases, use of one or more of these ionic liquids yield solutions of up to thirty-five percent (35%) cellulose or more.

The rheological properties of the high concentration cellulose solution render it appropriate for use in wet spinning without further processing. A solution that can be wet spun directly eliminates one or more steps to increase the concentration of the cellulose solution from stock fibers, and such solution allows all the otherwise wasted cotton fibers to be reclaimed without the need of mixing in virgin fibers.

One reason ionic liquids are attractive for the dissolution of cellulose is that certain physical properties of ionic liquids can be tailored by the selection of ions and substituents on the R cation group. Thus, the water solubility of imidazolium, oxide acetate, and methyl oxide ionic liquids can be tailored for the selected needs of a specific cellulose fiber depending on the degree of polymerization.

FIG. 1 is a schematic illustrating the molecular structure of cellulose in an embodiment of a cellulose chain. Cellulose fibers are held together by hydrogen bonding. Synchotron X-ray and neutron diffraction data shows the intermolecular bonds between the hydroxyl group on C6 in a cellulose molecule hydrogen bonded to the O atom on C3 of an adjacent cellulose chain. When these hydrogen bonds are disrupted, the cellulose fibers will separate and dissolve in an ionic liquid. Such separation and dissolution is accomplished when the anion in the ionic liquid form H-bonds with the hydroxyl groups in several adjacent chains, causing the negatively charged anio-cellulose complexes to repel each other and separate. In this case, the cellulose fibers are not chemically broken down; rather, the cations in the ionic liquid compete with the intermolecular bonding site where the cellulose fibers form H-bonds, and this disruption causes the cellulose fibers to dissolve in the ionic liquid. The now-dissolved cellulose fibers can readily be respun using the ionic liquid/cellulose solution as the spinning dope after said cellulose fibers are isolated from the original poly-cotton blend to be recycled.

Notably, various mechanisms described in the present disclosure to dissolve cellulose fibers in ionic liquids are not the same as traditional chemical recycling. Chemical recycling of textiles involves using a catalyst to depolymerize one of the two polymers in a poly-cotton blend. The embodiments described herein do not require any such catalyst and do not significantly depolymerize or effect the degree of polymerization of the cellulose. That is, applying the teaching of the present disclosure to breakdown and recover cellulose fiber materials will typically have even less effect on the degree of polymerization than any natural depolymerization that occurs in day-to-day uses of a textile (e.g., via sunlight, physical rubbing, washing, and the like).

It has been learned by the inventors that in some cases, at commercial scale and via unified processes, cotton and polyester fibers may be separated from each other and into fibers that are indistinguishable from virgin fibers. For example, solutions of 1-Allyl-3-methylimidazolium chloride (AMIM-CL) and 1-butyl methylimidazolium acetate (BMIM-OAc), both dried thoroughly to less than 0.2% water, are known to have cellulose dissolving properties. It has been further learned by the inventors that neither AMIM-CL nor BMIM-OAc dissolve polyester.

Efficacy testing of ionic liquids in separating cotton and polyester fibers has been performed by oven drying multiple yarn samples and preparing various yarn solutions in both BMIM-OAc and AMIM-CL. Exemplary temperatures actually or otherwise contemplated for the testing include "room temperature," temperatures between about ten degrees Celsius (10° C.) and about one-hundred-seventy-five degrees Celsius (175° C.), a temperature about eighty degrees Celsius (80° C.), and other temperatures, including temperatures below ten degrees Celsius (10° C.) and temperatures above one-hundred-seventy-five degrees Celsius (175° C.). Room temperature, as the term is used in the present application, is the generally ambient temperature of air, which may be heated or cooled, in the industrial environment where textile recycling is performed.

Exemplary yarn solutions include concentrations at about two percent (2%), about four percent (4%), about six percent (6%), about eight percent (8%), and about ten percent (10%) yarn sample by weight. Other concentrations, including concentrations below two percent (2%) and above ten percent (10%) have also been tested or otherwise contemplated by the inventors. During testing and during certain other ongoing analysis, yarn samples remained in the various ionic liquid solutions for selected amounts of time. In some cases, the time in solution was between about five minutes (5 min.) and about ten hours (10 hr.). In these and other cases, the time in solution was more than about thirty minutes (30 min.) or less than about eight hours (8 hr.). In at least one exemplary case, the time in solution was about six hours (6 hr.), and in at least one other exemplary case, the time in solution was less than two hours (2 hr.). After the selected time in solution, solids were removed from the subject solution, rinsed, and weighed by known processes, and the quality of at least some of the recovered fibers (e.g., the recovered cotton) was characterized. Characterization methods included one or more of dynamic mechanical analysis (DMA), thermogravimetric analysis (TGA), and Fourier transform infrared spectroscopy (FTIR). Test results were compared with data from as-received virgin fibers, and no difference was noted. Other testing and characterization methodologies are also contemplated.

In addition to recovered cotton fibers, recovered polyester fibers were characterized via various methods including, but not limited to, differential scanning calorimetry (DSC), thermogravimetric analysis (TGA), carbon nuclear magnetic resonance (NMR), and Fourier transform infrared spectroscopy (FTIR). Results of the characterization of recovered polyester fibers were contrasted with as-received virgin fibers, and no difference noted. Hence, it has been learned by the inventors that in at least some cases, at commercial scale and via unified processes, AMIM-CL is shown to selectively dissolve the cotton components of cotton/polyester blends at higher yields than BMIM-OAc, and that use of both AMIM-CL and BMIM-OAc ionic liquids in commercial processes can produce recovered cellulose and polyester fibers at very high yields.

Several other strategies to address the growing need for cellulose fibers in industry through the regeneration of dissolved cellulose in ionic liquids and alkali solutions have been studied and learned by the inventors. Chemical recycling of poly-cotton blends, for example has been studied. Such chemical recycling may offer an environmentally benign approach to closing the cellulose gap, but such methods have not yet been found by the inventors to provide commercial scale recycling via unified processes. The chemical recycling mechanism by which cellulose fibers are recovered is through both depolymerization and preferential dissolution. That is, while it has been learned that ionic liquids can successfully completely dissolve cellulose polymers with widely varying degrees of polymerization, other methods of producing recycled cellulosic fibers chemically are also available. Such other methods include, for example, chemical or physical dissolution of cellulose polymers in alkali baths. In a least one case studied, viscose rayon fiber can be produced by a chemical dissolution process in which cellulose fibers are regenerated from cellulose xanthate salts dissolved in an acid bath. Lyocell fibers in another case are produced by complete physical dissolution of cellulose fibers in N-methylmorpholine-N-oxide Hydrate, after which Lyocell fibers are regenerated in an aqueous bath.

The inventors have also learned that in some cases, at commercial scale and via unified processes, ionic liquids can be used to dissolve cotton fibers in denim. New fibers may be generated via one or more known means such as wet spinning. Some of such unified processes to recycle denim may be executed in a way that preserves the original coloring of the fibers, and others of such unified processes may be executed in a way that removes the original coloring to produce neutral fibers. In at least one exemplary use case, buyers of recycled fibers are the original manufacturer of the products being recycled. In this way, the original manufacturer can use the recycled fibers having original color without having to re-dye or otherwise color the raw materials used to make new products. Other use cases are of course contemplated At least one process to recycle denim uses dimethyl sulfoxide (DMSO) and an ionic liquid (e.g., AMIM-CL, BMIM-OAc, or another ionic liquid) to dissolve cellulose fibers in denim waste. By including DMSO as a cosolvent in a unified process, the resulting solution may have a reduced viscosity and thereby be used as a more favorable or versatile spinning dope (SD), which in some cases is the first component of a wet spinning process of textile manufacturing. In addition to reduced viscosity, or in the alternative, DMSO or other cosolvents may be used to increase viscosity, change thermal characteristics of selected reactions, or provide other still desirable rheological properties to a spinning dope. The spinning dope is a dissolved polymer solution that is formed prior to spinning the solution into filaments using the wet-spinning process. In many cases, this unified approach saves energy in the spinning process of regenerating fibers.

In some cases, cotton fibers to be recycled are pretreated via cutting, tearing, shredding, pulverizing, grinding or some other such means. The pretreating may result in materials that are rendered into pieces, clumps, clusters, particles, a fine powder, or some other form. Most or all of the constituent elements of the pretreated materials (e.g., pieces, clumps, clusters, particles, and the like) may have a nominal size of between about one hundred microns (100μ) and about one centimeter (1 cm). In some cases, the constituent elements have a nominal size of less than about two hundred microns. In still other case, constituent elements having a nominal size less than about one hundred microns (100μ) or more than about one centimeter (1 cm) are contemplated.

In some cases, pretreated materials are immersed in an aqueous NaOH solution at a selected temperature, washed with, for example, deionized water until a neutral pH was regained, and then dried using, for example, an oven, a radiant heating element, a forced air system, or some other drying means. The selected temperature may be between about ten degrees Celsius (10° C.) and about one-hundred fifty degrees Celsius (150° C.). In some cases, the selected temperature is about ninety degrees Celsius (90° C.). In other cases, a selected temperature is less than about ten degrees Celsius (10° C.) or more than about one-hundred fifty degrees Celsius (150° C.). In some cases, the selected temperature is room temperature.

After pre-treating, which may optionally include any or all of the acts of immersion, washing, pH balancing, and drying, the treated fibers are in some cases of a unified commercial recycling process dissolved in a solvent and ionic liquid solution at a selected temperature for a selected amount of time. In at least one case, the solvent and ionic liquid solution is a 1:4 DMSO and BMIM-OAc solution, the selected temperature is about eighty degrees Celsius (80° C.), and the selected amount of time is about thirty minutes (30 min.). In other cases, the selected temperature may be between about sixty degrees Celsius (60° C.) and about one hundred degrees Celsius (100° C.), however temperatures below sixty degrees Celsius (60° C.) and above one hundred degrees Celsius (100° C.) are contemplated. In these other cases, the selected time may be between about five minutes (5 min.) and about two hours (2 hr.), however times below five minutes (5 min.) and above two hours (2 hr.) are also contemplated.

Based on particular testing, research, and analysis of various pretreatment methodologies employed to produce a spinning dope, the inventors have learned that the re-constructability of raw textile materials is affected by the rheological properties (e.g., deformation, deformability, flowability, viscosity, and other fluidic parameters) of the cellulose-bearing solution. The rheology of the cellulose-bearing solution (i.e., the spinning dope) was found to be influenced by temperature, polymer concentration, degree of polymerization, the addition of a cosolvent (e.g., DMSO, Dimethylformamide (DMF), gamma-Butyrolactone (GBL), N-Methyl-2-pyrrolidone (NMP), Dimethylacetamide (DMAc), and the like), and other factors. In some cases, the degree of polymerization of fibers may be measured with an Ostwald viscometer and recorded. In some cases, the rheological properties of the fibers may be analyzed on a Rheometer and recorded. In these and other cases, the mechanical properties of recovered fibers may be analyzed using one or more of a load cell, a scanning electron microscope (SEM), a torsion meter, a dynamometer, a Coriolis flow meter, and other such equipment. Still other test equipment for determining one or more physical properties of reclaimed cellulose fibers is also contemplated. In testing performed by the inventors using various teaching of the present disclosure, mechanical properties of recovered fibers were found to be commercially indistinguishable from comparable virgin fibers.

As taught in the present disclosure, cellulose dissolves in both acetate and imidazolium ionic compounds. Favorably, polyester is insoluble in both acetate and imidazolium ionic liquids. Accordingly, the inventors have learned that one or more of the ionic liquids in this group are appropriate solvents for separating cellulose/synthetic blends through the dissolution of cellulose fibers. Further research has conclusively shown that commercial scale unified processes can separate cotton and polyester fibers in high yield, and the resulting fibers are commercially indistinguishable from virgin fibers. In some exemplary cases, the reclaimed cellulose fibers can then be respun via wet spinning or another process, and the cellulose/IL solution is an appropriate spinning dopant with no further processing necessary. Accordingly, the teaching of the present disclosure presents a commercial-scale unified process that is efficient and effective for commercially viable industry use. The teaching also describes one or more optional features of the unified process. For example, reclaimed cotton fibers can be produced in a manner that preserves their original coloring if desired, thereby making dyeing unnecessary and further improving the efficiency of the processes described herein. Optionally, reclaimed polyester fibers can also be wet spun when suspended in an appropriate solvent that provides the certain rheological properties selected for wet spinning. Other optional features of a commercial-scale unified process for recycling textiles are also contemplated.

Figure 2A:
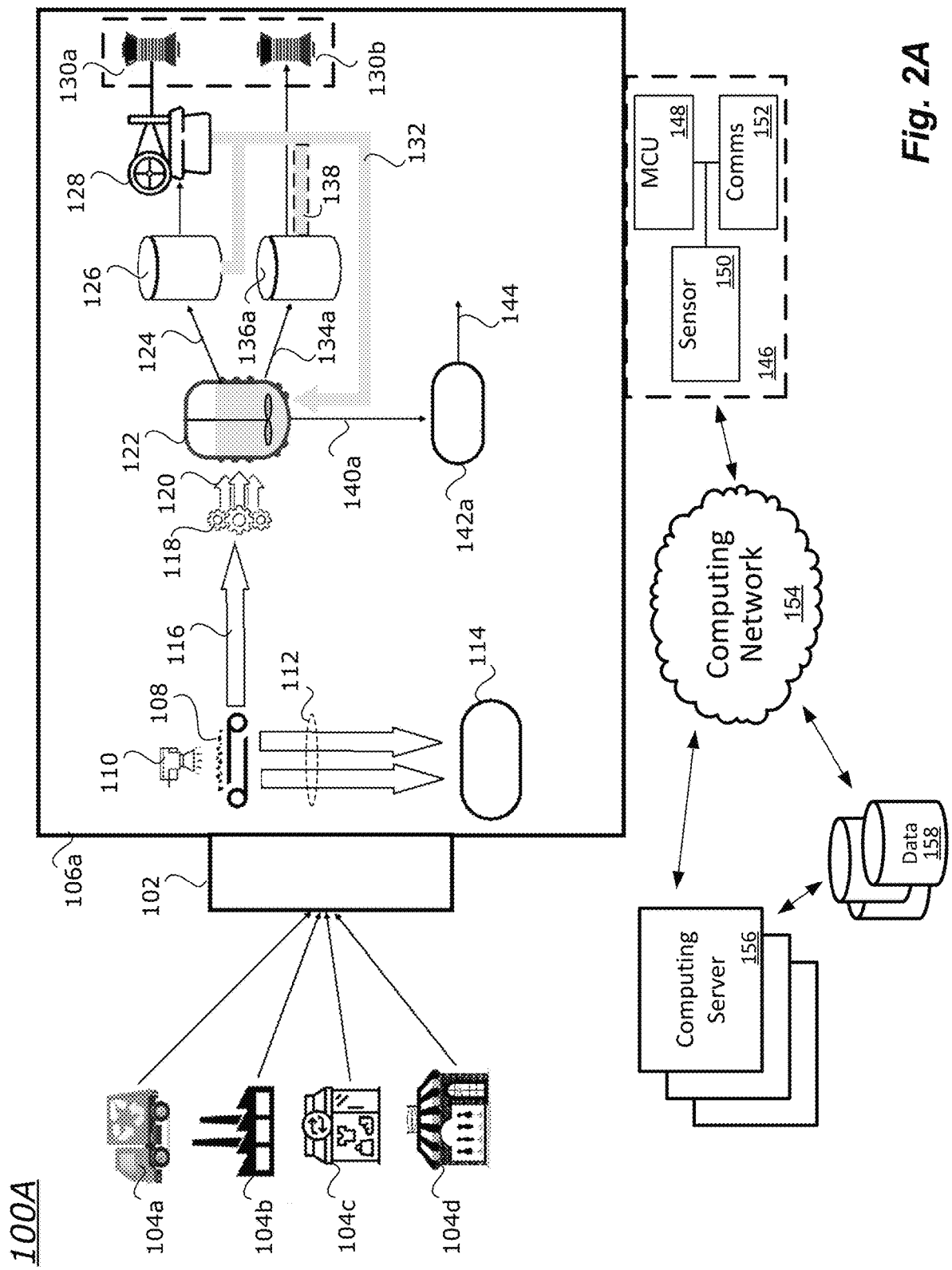
FIG. 2A is a first unified textile recycling system embodiment.

FIG. 2A is a first unified textile recycling system 100A embodiment. In the system 100A, a single workflow: 1) receives raw textile materials at a system input, 2) processes the textiles via one or more chemical and mechanical acts to recycle textiles into their component fibers, and 3) prepares one or more recovered fiber materials at a system output. The recovered fiber materials are substantially equal in quality with virgin fiber (i.e., commercially indistinguishable). That is, via one or more techniques generally accepted in industry (e.g., load cell, scanning electron microscope (SEM), torsion meter, dynamometer, Coriolis flow meter, and other such equipment used to determine one or more physical properties of textile fibers), the recovered fiber materials may be commercially indistinguishable from virgin fibers.

In at least some cases, the first unified textile recycling system 100A is arranged to produce recovered fibers that retain certain properties from their pre-processed state (e.g., color, nominal fiber length, manufacturer identifiers, and the like). In other cases, the system 100A is arranged to produce recovered fibers that appear as if commercially first formed from newly harvested or otherwise generated raw materials (i.e., virgin fibers). In still other cases, the system 100A is arranged to produce recovered fibers having new properties expressly introduced such as a dye or other color additive, a certain fiber length, a manufacturing identifier, a particular blend, or one or more other such properties.

In embodiments described in the present disclosure, system 100A is arranged to process cotton and cotton blend textiles. One of skill in the art will recognize, however, that system 100A is not so limited and other materials may of course be processed. That is, by applying the teaching of the present disclosure, substantially all fabric waste (e.g., more than fifty percent (50%), more than seventy-five percent (75%), more than ninety percent (90%), more than ninety-five percent (95%), or more than some other percentage greater than 95% of fabric that is deemed waste, dumped in landfills, incinerated, or otherwise targeted for destruction) may be processed according to the teaching of the present disclosure. In this way, commercial application of the teaching set forth in this disclosure may provide economic value in the resale of recovered fibers and avoided landfill fees, significantly reduce global greenhouse gasses created during natural or manmade destruction of the textile waste, significantly reduce use of airable land (e.g., for farming or other manufacturing of raw materials, for landfills, and the like), and significantly reduce use of agricultural water.

In the first unified textile recycling system 100A of FIG. 2A, a material receiving dock 102 intakes textiles-to-be-recycled. The material receiving dock may be a shipping platform, a garage, a door, a bin, a basin, a cart, or any other suitable physical location or structure suitable to receive textiles-to-be-recycled. In the system 100A embodiment, textiles are received from municipal collections 104a (e.g., recycling trucks, dump trucks, vans, or the like generally directed by a city, a government or some other entity), from fabric mills and clothing factories 104b, from surplus clothing stores 104c or other such establishments, and from brands, distributors, and retailers 104d. Other sources of textiles-to-be-recycled are of course contemplated.

The received textiles may be individual articles of clothing, bulk textiles, pre-treated materials, or textiles in any single or mixed form. The received textiles may be cleaned or not. The textiles may be sorted or not. The textiles may be dry or wet. Optionally, textiles received for recycling may be recycled as taught in the present disclosure. Pre-sorting, pre-cleaning, and pre-processing of any suitable type may be performed to increase the speed, efficiency, or other such properties of the systems, devices, and methods taught herein, however, such pre-processing is optional. Stated differently, a system in accordance with system embodiment 100A of FIG. 2A, may be arranged to presume or require some pre-processing of textiles for recycling, but other systems in accordance with system embodiment 100A of FIG. 2A may not have such limitations.

After textiles are received at the material receiving dock 102, some or all of the textiles-to-be-recycled are passed into a first unified recycling workflow 106a. The first unified recycling workflow 106a in at least some embodiments is a single workflow in which all textiles-to-be-recycled are mechanically, chemically, or mechanically and chemically processed. The first unified recycling workflow 106a may be contained in a single location (e.g., a single factory, a single room, a single housing, or the like). In other cases, some or all subsystems of the first unified recycling workflow 106a may be separate, distinct, remote, or otherwise not contained in a single location.

The textiles-to-be-recycled may in some cases include undesirable textile materials, non-textile materials, or undesirable textile and non-textile materials. These undesirable textiles may be smaller quantities or commercially undesirable for any reason. The undesirable non-textiles may have other value based on intrinsic structure, recyclability, or for other reasons. An exemplary and non-exhaustive list of undesirable materials includes zippers, buckles, clasps, buttons, rivets, wires, supports, hook-and-loop sub-systems, elastics, paper, rubber, gum, adhesives, fire retardants, water repellant chemicals, insect repellant chemicals, pathogen-destructive chemicals, dirt, food, plastics, coins, or the like. In some cases, certain materials are undesirable and in other cases the same certain materials may be desirable. As taught in the present disclosure, at least some embodiments of the first unified recycling workflow 106a are robust enough to selectively process any undesirable materials that enter the workflow with the desirable textiles-to-be-recycled.

The first unified recycling workflow 106a is arranged to isolate and recover selected desirable fibers. Generally speaking, there are three categories of fibers: 1) plant based, which may be referred to using one or more of the terms cellulose, cellulosic, or the like; 2) synthetic, which may be referred to as fossil-fuel-based, man-made, or the like; and 3) animal, which may be referred to as protein-based or some other like term. Exemplary cellulose fibers include, but are not limited to, cotton, linen, rayon, hemp, jute fibers, lyocell, bamboo, reed, and the like. Exemplary synthetic fibers include, but are not limited to, polyester, nylon, acrylic, polyolefin, and the like. Exemplary animal fibers include, but are not limited to, sheep wool, goat wool, cashmere, alpaca, mohair, rabbit hair, camel hair, silk, leather, and the like.

After the textiles-to-be-recycled enter the first unified recycling workflow 106a, the textiles-to-be-recycled 108 may be conveyed by a conveyance mechanism (e.g., conveyor belt, rollers, lifts, gates, pistons, magnets, robotic arms, suction, and any other such means to move articles) to one or more locations for any suitable reason. Optionally, for example, the textiles-to-be-recycled 108 may be sorted. In at least one case, sorting is performed manually. In other cases, sorting may be performed by weighing. In one exemplary case, such as in the system 100A embodiment of FIG. 2A, textiles-to-be-recycled 108 are optically sorted.

An optical sorting subsystem 110 may include one or more cameras of any suitable type, one or more optical filters, and any other suitable optical, temperature, or other sensor technologies that may be used to distinguish, or to assist in the distinguishing of, one type of textile from another. Accordingly, the optical sorting subsystem 110 may be include sensors that detect electromagnetic signals in the human visual spectrum, the human non-visual spectrum, or any other portion of the electromagnetic spectrum. In at least one case, the optical sorting subsystem 110 includes one or more human-visual-spectrum optical cameras and corresponding machine-learning (e.g., artificial intelligence, image recognition, or the like) software, and in at least one other case, the optical sorting subsystem 110 includes infrared-based cameras, probes, or other sensors implemented with cooperative executable software.

Infrared cameras may include one or more of forward looking infrared (FLIR) cameras, Fourier transform infrared (FTIR) cameras, or some other infrared-technology-based cameras. In these and other cases, spectroscopic techniques may be used to determine the molecular composition of the textiles-to-be-recycled 108. These spectroscopic techniques may be used to generate one or more digital signatures representative of some or all of the textiles-to-be-recycled 108. For example, the optical sorting subsystem 110 may be used to create a first digital signature representing cotton material, a second different digital signature representing polyester material, a third digital signature representing a particular blend of cotton and polyester, a fourth digital signature representing a certain leather material, a fifth digital signature representing a certain paper material, and so on. The particular signature that is generated to represent each article of the textiles-to-be-recycled 108 may then be used to direct the conveyance mechanism to move said article.

In the first unified textile recycling system 100A embodiment of FIG. 2A, the optical sorting subsystem 110 directs non-cellulose materials 112 toward non-cellulose material processing 114. The non-cellulose materials 112 may include pure synthetics, protein-based materials, non-textiles, and other such materials. The non-cellulose material processing 114 may be composted or used in traditional post-consumer fiber products such as cardboard. Additionally, or alternatively, the non-cellulose materials 112 may be chemically recycled (e.g., pure polyester) or recycled in another known way.

Concurrent with the optical sorting subsystem 110 directing movement of or other processing of non-cellulose materials 112, or in some other timing, the optical sorting subsystem 110 directs cellulose-based materials 116 (e.g., pure cellulose or cellulose blends) toward a cellulose solvent reactor 122. Optionally, a re-sizing subsystem 118 may be used to prepare the cellulose-based materials 116 for improved cellulose dissolution.

In cases where the re-sizing subsystem 118 is used, the subsystem may pretreat the cellulose-based materials 116 by cutting, tearing, shredding, pulverizing, grinding, or performing some other such act as described in the present disclosure. In at least one exemplary case of the system 100A embodiment, the pretreating results in materials that are rendered into pieces having a nominal size of about one square centimeter (1 sq. cm) or less. This pretreating may also have the effect of partially or completely separating the cellulose-based materials 116 into materials that will be dissolved (e.g., cellulose) from other materials such as buttons, buckles, zippers, clasps, loops, rivets, wires, foam, rubber materials, elastic materials, and the like. In some cases, the re-sizing subsystem 118 may include zero or more magnets, electrostatic or other electrically charged surfaces, air moving equipment, or other subsystems useful for separating desirable materials from undesirable materials.

The pretreated material from the re-sizing subsystem 118, or the cellulose-based materials 116 itself if the optional re-sizing subsystem 118 is not included, is passed as feedstock 120 toward the cellulose solvent reactor 122. The feedstock 120 will contain cellulose-based fibers. The feedstock 120 may also contain synthetic fibers, animal fibers, and non-fibrous materials (e.g., silicates, silicate salts, raw metals, oil, water, and the like).

The cellulose solvent reactor 122 includes at least one reservoir arranged to receive the feedstock 120 and to dissolve the cellulose-based fibers in the feedstock 120. The dissolution of the cellulose-based fibers is an ionic liquid process performed according to the teaching of the present disclosure. Particularly, upon immersion of the feedstock 120 in a solution of one or more selected ionic liquids, the hydrogen bonds in the molecular structure of the cellulose chains are disrupted, and the cellulose fibers separate and dissolve in the ionic liquid. Notably, the cellulose fibers do not break down chemically, but instead, the fibers are dissolved in the ionic liquid. Desirably, the non-cellulose materials are not dissolved.

The cellulose solvent reactor 122 may include any suitable number of one or more reservoirs. Optionally, the cellulose solvent reactor 122 may include any one or more of a temperature control subsystem, an agitation subsystem, a pressure subsystem, a flushing subsystem, one or more inlet ports, one or more outlet ports, one or more water sources, one or more ionic liquid sources, filtering apparatus, metering apparatus, one or more pumps, and any other suitable control subsystems and structures. As described in the present disclosure, a variety of ionic liquids have been tested, and particular test results have been recognized by the inventors. Certain improvements in the time it takes to dissolve a particular feedstock 120 batch, the efficiency of a dissolution process, the energy required to perform a batch process, and other such improvements may be affected by temperature, pressure, batch size, reservoir size, time-in-solution, the selected ionic liquid or combination of liquids, and the like.

In the first unified textile recycling system 100A embodiment of FIG. 2A, in the cellulose solvent reactor 122, after a selected period of time, and after selected processing, a cellulose-bearing solution 124 is passed to a cellulose coagulation bath reservoir 126; a second solution 134a is passed to a second solution reservoir 136a, and insoluble materials 140a are passed to an insoluble materials receptacle 142a.

The cellulose-bearing solution 124 includes the now-dissolved cellulose fibers, which can readily be re-spun using the ionic liquid/cellulose solution as a spinning dope. The cellulose coagulation bath reservoir 126 includes a liquid, such as water, deionized water, or some other liquid. When the cellulose-bearing solution 124 is introduced into the cellulose coagulation bath reservoir 126, the cellulose fibers begin to coagulate (e.g., congeal, solidify, precipitate, grow, "fall out," or the like). The coagulating fibers are drawn out from the cellulose coagulation bath reservoir 126 and into a wet-spinning spinneret subsystem 128 and extruded from the spinneret as one or more continuous threads. Collectively, or individually, the coagulation bath reservoir 126 and the wet-spinning spinneret subsystem 128 may include a single or multi-hole spinneret, temperature controls, one or more liquid inlets, one or more liquid outlets, drawing apparatus (e.g., any suitable number of zero or more rollers, godets spindles, and the like), washing apparatus (e.g., reservoirs, receptacles, tensioners, and the like), drying apparatus, dyeing apparatus, coating or other treatment apparatus (e.g., fire retardant, water repellant, and the like), finishing apparatus (e.g., coatings, packing, trimming, waxing, and the like), winding apparatus (e.g., industrial bobbins, industrial bobbin winder, and the like), and other such textile processing equipment. Some of the apparatus that comprise the coagulation bath reservoir 126, the wet-spinning spinneret subsystem 128, or both the coagulation bath reservoir 126 and the wet-spinning spinneret subsystem 128 are optional.

The coagulation bath reservoir 126 and the wet-spinning spinneret subsystem 128 cooperate to produce recycled cellulose fibers that are commercially indistinguishable from virgin cellulose fibers (i.e., cellulose fibers produced from a first use of raw materials). In the system 100A embodiment of FIG. 2A, the recycled cellulose fibers are spun into threads or a yarn (e.g., a filament) and wound on a first industry standard bobbin 130. In other embodiments, the recycled cellulose fibers may be arranged into a different commercially desirable format.

The coagulation bath reservoir 126 and the wet-spinning spinneret subsystem 128 will include some or all of the ionic liquid(s) that were used in the cellulose solvent reactor 122 to dissolve the cellulose portions of the feedstock 120. This ionic liquid is nonvolatile and not depleted or consumed during the dissolution process. After the fibers and other solid materials are removed from the cellulose-bearing solution, the ionic liquid may pass back to the cellulose solvent reactor 122 or another receptacle via an ionic liquid recover loop 134a. In some cases, the ionic liquid recovery loop 132 may include one or more heating elements, vents, and other structures to boil off water or other materials from the ionic liquids. In this type of closed loop first unified recycling workflow 106a, the reaction and recovery cycle of recycling the cellulose fibers operates with reduced health and environmental hazards, with ambient or otherwise commercially low temperatures, and with low cost and energy efficiency.

In some cases, the second solution 134a may partially or totally include synthetic fibers, animal fibers, or other materials. The second solution may include synthetic or other fibers, in their original state, suspended in the ionic liquid of the cellulose solvent reactor 122. These synthetic or other fibers are vacuum-extracted, or mechanically filtered from the cellulose solvent reactor 122 or they are removed from the cellulose solvent reactor 122 by some other known means. These synthetic or other fibers are processed in a known way and spun onto a second industry standard bobbin 130B. In at least some cases, recycled cellulose materials from a first wet spinning spinneret subsystem 128 may be optionally combined with recycled synthetic materials from the second solution reservoir 136a.

In some cases, rather than synthetic fibers or animal fibers, the second solution may include cellulose fibers that are different from the fibers found in the cellulose-bearing solution 124. The fibers in the second solution 134a have bonds that were not dissolved in the cellulose solvent reactor 122. In this case, the cellulose solvent reactor 122 may be a first reactor having a first type or blend of ionic liquids, and the second solution reservoir 136a may be a second reactor having a second type or blend of ionic liquids. Accordingly, it is contemplated in the present disclosure that a first unified recycling workflow 106a may in some cases have two or more stages of cellulose solvent reactors, wherein each reactor has selected ionic liquids that target a different type of cellulose fiber for recycling. In cases such as this, the second solution reservoir 136a may further include a system of coagulation bath reservoirs and wet spinneret subsystems along the lines of coagulation bath reservoir 126 and wet spinneret subsystem 128, and the resulting thread may be wound on a second industry standard bobbin 130B. In such cases, pure ionic liquid or ionic liquid in a blend 138 may be recovered and returned to the cellulose solvent reactor 122 via the ionic liquid recovery loop 132.

As described in the present disclosure, cellulose based fibers and synthetic fibers may be recycled and spun onto same or separate industry standard bobbins or some other means. Each fiber type can be spun into a wide range of threads, yarns, and the like (e.g., filaments) including, but not limited to, pure cotton, pure polyester, other pure materials, and a variety of new classes of hybrid fibers not now produced by industry. In some cases, an original color found in the cellulose-based materials can be retained; in other cases, a new color can be added, and in still other cases, all color may be removed to permit recycled materials to have a completely natural color state.

In the first unified textile recycling system 100A embodiment of FIG. 2A, insoluble materials 140a are passed to an insoluble materials receptacle 142a. The insoluble materials 140a may include synthetic fibers, animal fibers, zippers, buckles, clasps, buttons, rivets, wires, supports, hook-and-loop sub-systems, elastics, paper, rubber, gum, adhesives, fire retardants, water repellant chemicals, insect repellant chemicals, pathogen-destructive chemicals, dirt, food, plastics, coins, or the like. These materials may be separated and recovered, recycled, or otherwise disposed of in known ways. Such disposal may include chemical processing, high temperature processing (e.g., incineration, melting, and the like), re-purposing (e.g., processing into insulation, cardboard, cushion filling, foams, or the like). The disposed material 144 may be sent appropriately into industry or other offsite disposal.

In at least some cases of the system 100A embodiment of FIG. 2, the operations of the first unified recycling workflow 106a are optionally controlled, partially or completely, by a particular controller 146. The optional controller 146 may include a microcontroller 148, one or more sensors 150, network circuitry 152, and other circuits, which are not shown to avoid obscuring the teaching of FIG. 2A. An exemplary, non-exhaustive list of such other circuits include program memory having software executable by a processor of the microcontroller 148, data memory, power supply circuitry, user interface circuitry, timing circuitry, and the like.

The one or more sensors 150 may have any suitable form, size, features, capabilities, and underlying technologies. For example, in some cases, the sensors 150 include accelerometers, optical detectors, infrared sensors, pressure sensors, gas sensors, smoke sensors, color sensors, liquid detectors, flow sensors, temperature sensors, timers, load cells, gyroscopes, proximity sensors, ultrasonic sensors, and any other suitable sensor that provides useful information to the controller 146. Optionally, one or more of sensors 150 are communicatively coupled to the sorting subsystem 110, the conveyance system, the re-sizing subsystem 118, the cellulose solvent reactor 122, the cellulose coagulation bath reservoir 126, the wet spinning spinneret subsystem 128, the industry standard bobbins 130a-130c (FIGS. 2A, 2B), the ionic liquid recovery loop 132, second solution reservoir 136a, the insoluble materials receptacle 136b (FIG. 2B), the insoluble materials receptacles 142a, 142b, and any other particular circuits of the first unified recycling workflow 106a.

Optionally, the controller 146 may be arranged to communicate through a computing network 154 to one or more computing servers 156, one or more databases 158 (i.e., any suitable single or distributed data repository, local or remote), and other computing devices such as mobile computing devices, wearable computing devices, vehicle-based computing devices, and the like.

Figure 2B:
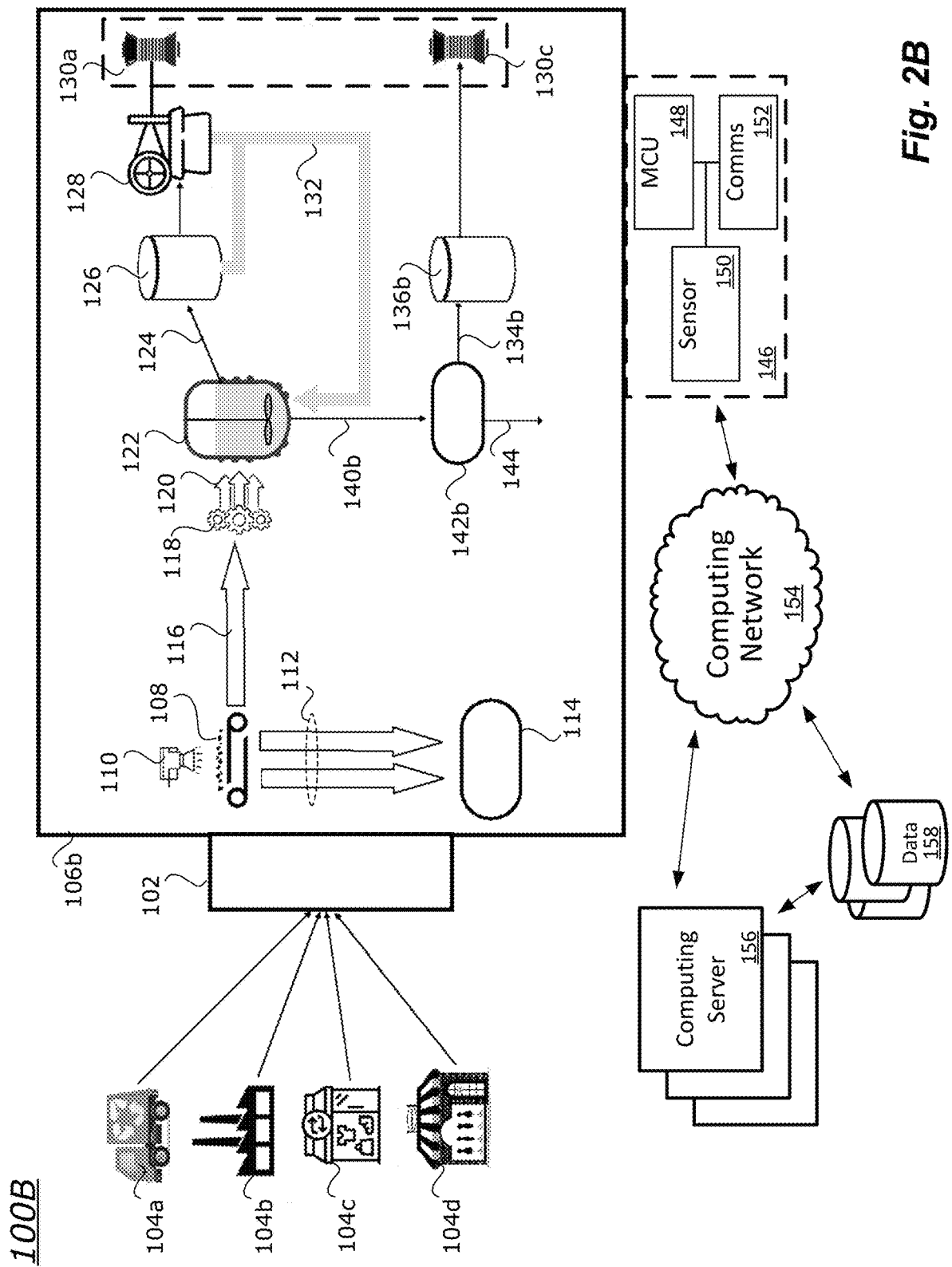
FIG. 2B is another unified textile recycling system embodiment.

FIG. 2B is another unified textile recycling system 100B embodiment arranged about a second unified recycling workflow 106b. Portions and operations of the system 100B of FIG. 2B are along the lines of those illustrated and described with respect to the system 100A of FIG. 2A. Accordingly, structures and acts earlier identified and described are not repeated for brevity.

In the embodiment of FIG. 2B, all of the cellulose-based materials found in the cellulose-based materials 116 are dissolved in the cellulose solvent reactor 122 and passed in the cellulose-bearing solution 124 to the cellulose coagulation bath reservoir 126. All of the remaining matter is passed as insoluble materials 140b to an insoluble materials receptacle 142b.

In the system 100B embodiment, the insoluble materials 134b are synthetic materials that are chemically reclaimed in the insoluble materials receptacle 142b. Threads, yarn, or synthetic fibers of some other form (e.g., filament) are wound on an industry standard bobbin or some other such commercially desirable structure. In at least some cases, recycled cellulose materials from a first wet spinning spinneret subsystem 128 may be desirably combined with recycled synthetic materials from the insoluble materials receptacle 142b.

FIG. 2C is a first batch reactor 222a in a third unified recycling workflow 106c embodiment. The third workflow 106c may optionally include one or more structures, subsystems, processes, and the like that are also found in the first and second unified recycling workflow 106a, 106b embodiments. To avoid unnecessarily cluttering the figure, however, various ones of such structures are not shown in FIG. 2C. For example, the third unified recycling workflow 106c embodiment may include a material receiving dock 102, control resources (e.g., controller 146, microcontroller 148, sensors 150, network circuitry 152, a computing network 154, computing servers 156, databases 158, and the like), bobbins 130a, 130b, 130c, and other structure, but these other structures are not shown in FIG. 2C.

The workflow 106c includes a premix wetting structure 202, a batch reactor 122a, a transducer 204, various sensors 206a, 206b, reaction probes 208a-208n, one or more heating circuits 210, an agitation structure 212, a settling receptacle 214, a filter 216, a pump 218, connective plumbing, support circuitry, conveyors, robotics, and any other suitable mechanical, electrical, and electromechanical structures known by one of skill in the art.

One exemplary embodiment of the third unified recycling workflow 106c is now described. Ones of skill in the art will recognize that various operations described herein may be executed serially, concurrently, or in a different order than described. In addition, various operations may be performed one time, two times, or any suitable number of times, and these or other operations may be optional and not performed at all.

In the exemplary embodiment, feedstock 120a and a wetting agent 220 are introduced into the premix wetting structure 202. In some cases, the feedstock 120a is along the lines of feedstock 120 described herein with respect to FIGS. 2A, 2B. In other cases, the feedstock 120a of FIG. 2C may include raw material, cut material, shredded material, combed material, cleaned material, uncleaned material, grounded up material, uncut or unground material, sorted material, unsorted material, or any other suitable material. In some cases, the feedstock 120a is a full-cotton material, in some cases, feedstock 120a is a blend of cotton and a synthetic or other fiber such as polyester, nylon, acrylic, polyolefin, and the like. Other fibers such as animal fibers may also be included. In at least some cases, all of the feedstock 120a may be from a single source (e.g., cutting factory (end bit and end loss) which and exceed 18% of the original bolt of material, a blue jeans manufacturer, a uniform manufacturer, a military branch uniform replenishment, an industrial clothing supplier, a restaurant supplier, or the like). Feedstock 120a may be pre-processed by a grinder, a hopper, a screw, a cutter, a shredder, or any other suitable pre-processing structure.

Wetting agent 220 is optional. In cases where it is used, wetting agent 220 includes any one or more suitable substances that reduce the surface tension of a particular target liquid thereby increasing the spread of the target liquid on solids that the target liquid comes into contact with. In many cases, the target liquid is water, and the wetting agent is selected to reduce the surface tension of the water or water-based solution by a suitable amount. Cyclohexanone is one substance that may form wetting agent 220. Other suitable wetting agents may include cationic compounds derived from imidazoline. Still other suitable wetting agents may be selected from surfactants or detergents used in other textile processing operations such as dyeing, cleaning, stripping, and the like. In these cases, wetting agent 220 may include sulfonated oil, soap, soy lecithin, mercaptan, mercaptan acetal, acyl hydrazine, or some other substance. Other suitable wetting agents 220 have also been contemplated.

The premix wetting structure 202 may be any suitable size and structure. In some cases, the premix wetting structure 202 is an open tank, and in some cases, the premix wetting structure 202 is an closed or partially closed tank. In some cases, the premix wetting structure 202 is a pressurized vessel.

In at least one case, the premix wetting structure 202 is at least 100 gallons, and in at least one other case, the premix wetting structure 202 is more than 500 gallons.

The premix wetting structure 202 may be formed of metal, plastic, a composite material, glass, fiberglass, or some other substance or substances.

The premix wetting structure 202 may include any suitable number of sensors (e.g., volumetric sensors, weight sensors, temperature sensors, pressure sensors, valves, ports, and the like), and such sensors may be used by a control system as described herein to start a unified recycling workflow, monitor a unified recycling workflow, control a unified recycling workflow, and the like. The premix wetting structure 202 may further include an agitation mechanism such as a rotating drum, a circulator or agitator having any suitable shape, size, and operational characteristics.

Feedstock 120a may include solid material only (e.g., one or more textile-based materials) or solid material suspended in a liquid, a pulp, a slurry, or some other flowable composition. In some cases, feedstock 120a and one or more liquids (e.g., water, wetting agent 220, or some other liquid or liquids) are combined in the premix wetting structure 202 to produce a flowable feedstock 222. In at least one case, the premix wetting structure 202 is arranged mechanically agitate a post grinding pulp and a wetting agent 220 to produce the flowable feedstock 222 as a slurry.

Flowable feedstock 222 is introduced into a first batch reactor 122a. The flowable feedstock 222 may include a targeted textile such as cotton and a wetting agent 220 that is added overcome the surface tension of an ionic liquid in the first batch reactor 122a. In at least some cases, the first batch reactor 122a is sized, shaped, and otherwise partially or completely formed along the lines of the cellulose solvent reactor 122 of FIGS. 2A-2B.

In the first batch reactor 122a, the flowable feedstock 222 is bathed in an ionic liquid solvent of the type discussed herein. The combined solution in the first batch reactor 122a may be heated, mixed (e.g., stirred, agitated, disturbed, perturbed, unsettled, beaten, churned, shaken, convulsed, blended, whisked, or the like), and monitored until a desired level of cellulose concentration is reached.

A determination that the desired level of cellulose concentration has been reached can be determined in any suitable way. In the third unified recycling workflow 106c embodiment of FIG. 2C, for example, various sensors are controlled, monitored, or controlled and monitored by a control system such as the control resources of FIGS. 2A, 2B. The sensors may optionally include one or more of transducer 204, sensors 206a, 206b, and reaction probes 208a, 208b, 208c, 208n.

In at least one embodiment, transducer 204 includes one or more light sources such as a laser or a tunable laser. In such cases, transducer 204 may be configured and controlled to emit photons (e.g., pulses, a stream, or photons in some other configuration). In at least one case, transducer 204 is arranged to emit pulses of photons at regular intervals at varying wavelengths, and such photons travel through the flowable feedstock 222 that is bathed in the ionic liquid solvent in the first batch reactor 122a.

To measure the concentration of cellulose dissolved in the ionic liquid solvent, photons or other electromagnetic energy 224 emitted by transducer 204 is detected by any suitable number and form of sensors 206a, 206b. One of skill in the art will recognize that the placement, structure, and operation of any suitable number of transducers 204 and the placement, structure, and operation of any suitable number of sensors 206a, 206b may be controlled and otherwise used by a control system. In this way, based on data provided by one or more sensors 206a, 206b, the control system is arranged to determine the cellulose concentration of the flowable feedstock 222 in the batch reactor 122a. The electromagnetic energy may be visible light, invisible light, sound, or some other electromagnetic energy. In at least one case, transducer 204 is a tunable laser arranged to emit pulses of photons at regular intervals at varying wavelengths through the ionic liquid and fabric slurry in the batch reactor 122a. In this and other cases, sensors 206a, 206b are high quantum efficiency photon detectors that determine a volume of photons that have passed through the slurry, and further in such cases, a control system integrates the changes in photo detection and phase shift to determine a level of cellulose in the slurry solution. Based on such detection, operation of the third unified recycling workflow 106c may be controlled, monitored, or controlled and monitored by a control system such as the control resources of FIGS. 2A, 2B.

In cases where the first batch reactor 122a includes an optional heating circuit 210, the circuit is used to control the solubility rate of cellulose in the ionic liquid. It has been learned by the inventors, for example, that the solubility rate of cellulose in ionic liquid is related the amount of energy introduced into the slurry.

In some cases, alternatively or in addition to cases where the first batch reactor 122a includes a heating circuit 210, the first batch reactor 122a may include an agitation structure 212. When so included, the optional agitation structure 212 may be used to keep the slurry in the first batch reactor 122a agitated and constantly moving. Such agitation may be caused by release of a pressurized, non-reactive gas into the slurry. The non-reactive gas may be dehumidified air from the atmosphere, nitrogen, carbon dioxide, or some other gas. Nearly any gas other than normal atmospheric gas that is used can be recaptured, liquified, and returned to storage for re-use. The inventors observe neither the ionic liquid solvent nor the ionic liquid cellulose solution off-gas and do not create a hazard to surrounding environments. The non-reactive gas may be compressed to one atmosphere or some other pressure. The non-reactive gas may be released as a flow of small bubbles. In this respect, the agitation structure may include a tube or other structure having any suitable number, size, and configuration of apertures.

In some cases, an agitation structure 212 is located proximate the heater circuit 210, and the two structures cooperate. That is, the release of bubbles may be enhanced or otherwise controlled by the addition or removal of heat proximate the release of the non-reactive gas.

In some cases, one or more reaction probes 208a, 208b, 208c, 208n may be arranged in the first batch reactor 122a. Such probes may be used to measure various properties of the slurry in the batch reactor. By measurement of such properties, the dissolution of the cellulose-based fibers is the ionic liquid may be raised, lowered, or otherwise maintained at a desired or otherwise acceptable thermodynamic level. When the optional reaction probes 208a-208n are included, any suitable number and configuration of probes may be deployed. In some cases, the reaction probes 208a-208n are arranged to measure temperature, in some cases, the reaction probes 208a-208n are arranged to measure electrical conductivity of the slurry, and in still other cases, the reaction probes 208a-208n measure still another one or more properties of the slurry.

One or more of the heating circuit 210, the agitation structure 212, and the reaction probes 208a-208n may be controlled, monitored, or controlled and monitored by a control system such as the control resources of FIGS. 2A, 2B.

At desirable times, a selected volume of cellulose-bearing solution 124 that includes now-dissolved cellulose fibers (i.e., spinning dope) is drawn or otherwise retrieved from the first batch reactor 122a. The cellulose bearing solution 124 is processed as described in the present disclosure with respect to FIGS. 2A, 2B.

Also at desirable times, ionic liquid that contains insoluble material 140c is drawn or otherwise retrieved from the first batch reactor 122a into a settling receptacle 214. The settling receptable may be a tank, a reservoir, or some other type of vessel. The insoluble material may be along the lines of insoluble material 140a (FIG. 2A) or insoluble material 140b (FIG. 2B). Solid material in the insoluble material 140c may be vacuum extracted, pressure filtered, or removed from the settling receptacle 214 in some other way.

Once the solid material is removed from insoluble material 140c solution, this now "skimmed" ionic liquid solution 226 is passed into a filter 216. The filter 216 may be a rotary baffle filter, a membrane filter, an electrostatic filter, or some other type of filter. The filter 216 may include an auto-backwash flapper, gate, or other structure. The filter 216 is generally arranged to strain out or otherwise remove any remaining particulate matter from the skimmed ionic liquid solution 226 to thereby create a refined ionic liquid solution 228. The filter 216, skimmed ionic solution 226, and refined ionic liquid solution 228 may form some or all of an ionic liquid recovery loop 132 as described with respect to FIGS. 2A, 2B.

Optionally, the third unified recycling workflow 106c may include a pump 218 and an ionic liquid feed/return path 230. Pump 218 may include one or more fixed speed, variable speed, fixed volume, variable volume or any other type of pump or pumps. Pump 218 and ionic liquid feed/return path 230 is generally operated to keep the material (e.g., flowable feedstock 222, slurry, ionic liquid, and the like) moving in the third unified recycling workflow 106c. The pump 218, along with any suitable number and configuration of valves (not shown), gates (not shown), ports (not shown), and the like may be controlled, monitored, or controlled and monitored by a control system such as the control resources of FIGS. 2A, 2B.

Figure 2D:
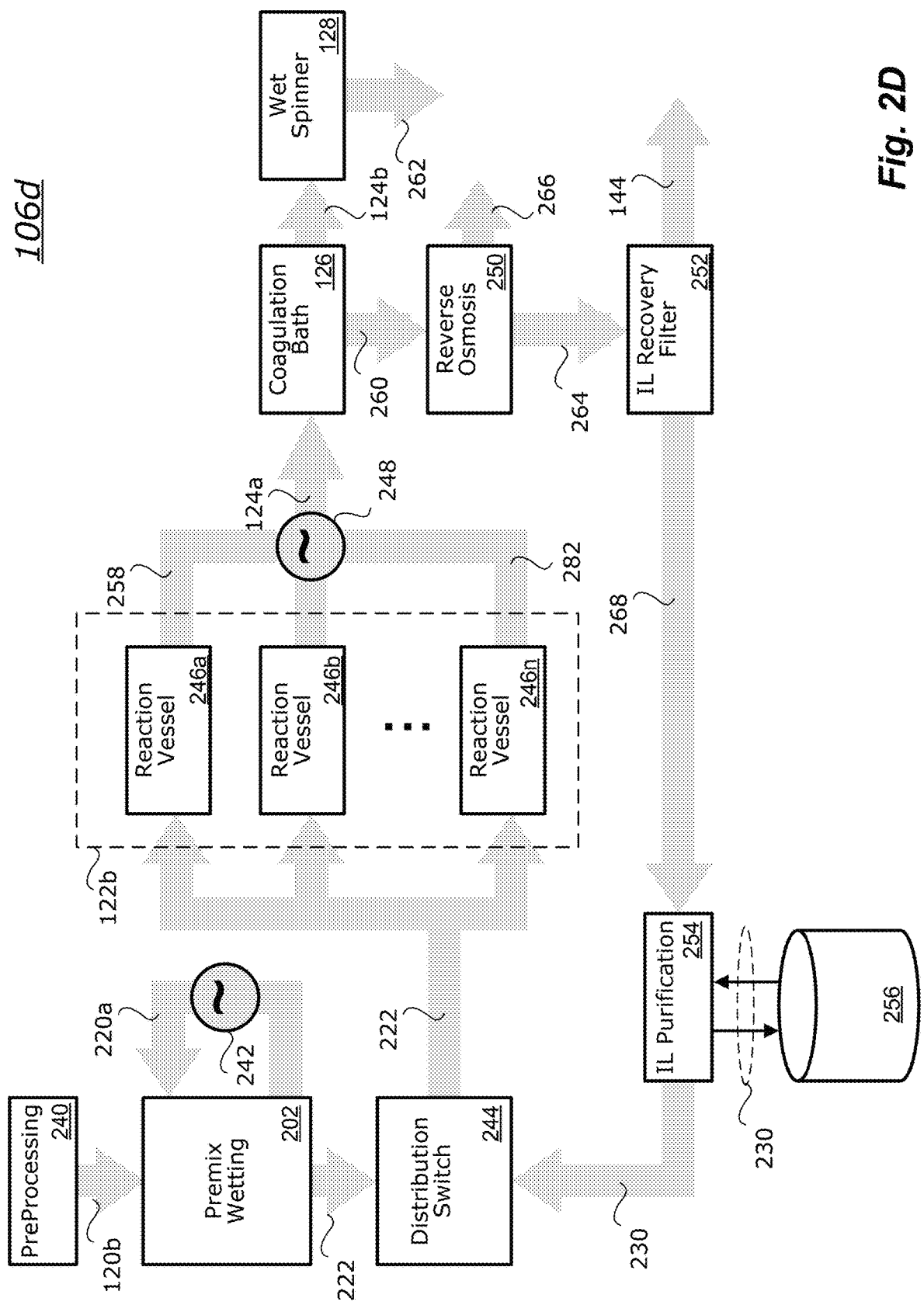
FIG. 2D is another batch reactor in a unified textile recycling system embodiment.

FIG. 2D is a second batch reactor 122b in a fourth unified recycling workflow 106d embodiment. The fourth workflow 106d may optionally include one or more structures, subsystems, processes, and the like that are also found in the first, second, and third unified recycling workflow 106a, 106b, 106c embodiments. To avoid unnecessarily cluttering the figure, however, various ones of such structures are not shown in FIG. 2D. For example, the fourth unified recycling workflow 106d embodiment may include a material receiving dock 102, control resources (e.g., controller 146, microcontroller 148, sensors 150, network circuitry 152, a computing network 154, computing servers 156, databases 158, and the like), bobbins 130a, 130b, 130c, and other structure, but these other structures are not shown in FIG. 2D.

The workflow 106d includes a preprocessing structure 240, a premix wetting structure 202, a distribution switch 244, a second batch reactor 122b that includes one or more reaction vessels 246a, 246b, 246n, a cellulose coagulation bath reservoir, a wet spinning spinneret subsystem 128, an extraction filter 250, a recovery filter 252, an ionic liquid purification structure 254, and an ionic liquid receptacle 256. Some of the structures of the workflow 106d may be optional. The workflow 106d may also include any suitable arrangement of connective plumbing, support circuitry, conveyors, robotics, and any other suitable mechanical, electrical, and electromechanical structures known by one of skill in the art.

One exemplary embodiment of the fourth unified recycling workflow 106d is now described. Ones of skill in the art will recognize that various operations described herein may be executed serially, concurrently, or in a different order than described. In addition, various operations may be performed one time, two times, or any suitable number of times, and these or other operations may be optional and not performed at all.

Processing in the fourth unified recycling workflow 106d begins in a textile preprocessing structure 240. The preprocessing may include any suitable operations to create a feedstock 120b. Feedstock 120b is along the lines of feedstock 120 described herein with respect to FIGS. 2A, 2B and feedstock 120a described with respect to FIG. 2C.

Feedstock 120b is introduced to an optional premix wetting structure 202. Premix wetting structure 202, when it is included in the workflow 106d is along the lines of premix wetting structure 202 of FIG. 2C. In at least some cases, a wetting agent 220a is injected into the premix wetting structure 202. Such introduction may include a liquid handling pump 242. The liquid handling pump 242 may be arranged as a backflow valve or otherwise include a backflow valve or properties of a backflow valve. Wetting agent 220a may be the same wetting agent as wetting agent 220 of FIG. 2C or a different wetting agent.

A flowable feedstock 222 is produced from the feedstock 120b. As described herein, flowable feedstock 222 is produced as a slurry or some other composition that may flow or otherwise be transported into a distribution switch 244.

Distribution switch 244 may be arranged in any suitable manner to mechanically, electrically, or electromechanically provide portions of flowable feedstock 222 to a second batch reactor 122b. The distribution switch 244 may include valves, gates, pumps, conduit, and any other such structures arranged in any suitable quantity, configuration, material, and operational characteristics. Distribution switch 244 may provide portions of flowable feedstock 222 sequentially, serially, concurrently, simultaneously, periodically, randomly, and the like.

Distribution switch 244 may include sensors, controllers, switches, actuators, and other control circuitry, logic, and electrically actuated structures. In at least some cases, operations of the distribution switch 244 may be controlled by control resources (e.g., controller 146, microcontroller 148, sensors 150, network circuitry 152, a computing network 154, computing servers 156, databases 158, and the like) such as the control resources of FIGS. 2A, 2B.

Second batch reactor 122b is a multistage reactor. In the fourth unified recycling workflow 106d, the batch reactor 122b includes a first reaction vessel 246a, a second reaction vessel 246b, and an nth reaction vessel 246n. One or more reaction vessels 246a-246n may be formed along the lines of cellulose solvent reactor 122 of FIGS. 2A, 2B. In addition, or in the alternative, one or more reaction vessels 246a-246n may be formed along the lines of the first batch reactor 122a of FIG. 2C. In still other cases, one or more reaction vessels 246a-246n may be formed with some other configuration. In some cases, each reaction vessel 246a-246n is formed alike, and in other cases, one or more reaction vessels 246a-246n is different from one or more other reaction vessels 246a-246n.

Reaction vessels 246a-246n may have any suitable shape, size, volume, materials, configuration, and other properties. In some cases, any reactor vessel described in the present disclosure (e.g., the reaction vessels 246a-246n) may have a spherical, semi-spherical, ellipsoid, semi-ellipsoid, or other like symmetrical shape. Forming such a vessel may be beneficial to address a known "isolated corner" problem in liquid mixing where corners typically do not receive adequate laminator or turbulent mixing forces. In at least some embodiments, reaction vessels are formed without interior corners (e.g., spheroid, ellipsoid, and the like) on an inside volume while retaining a square, rectangular, or other regularly shaped structure having flat or otherwise desirable outside dimensions that facilitate flat surface stability, stackability, interlocking, and the like. In some cases, one or more reaction vessels 246a-246n has a volume of twenty-five (25) gallons or less. In other cases, one or more reaction vessels 246a-246n has a volume of greater than twenty-five (25) gallons. In some cases, one or more reaction vessels 246a-246n has a volume of about 500 gallons. In some cases, one or more reaction vessels 246a-246n has a volume of over 500 gallons. In at least one case, a second batch reactor 122b has a plurality of reaction vessels 246a-246n that in total have a volume of more than 25,000 gallons.

In some cases, the reaction vessels 246a-246n may be arranged as modules or modular reactors that can be brought online or taken offline at will. Each reactor may include sensors, monitors, or other control circuitry that allows a human or non-human control mechanism to bring control an output flow of cellulose bearing solution 124a from the second batch reactor 122b. As it has been learned by the inventors, the rate of production of cellulose-bearing solution can be increased or decreased, within some limits, based on time, energy input to the system or withheld from the system, arrangement of feedstock, selection of ionic liquid, amount of exposed or exposable surface area of the raw feedstock to the ionic liquid, and other factors. Based on such information, any suitable number of reaction vessels 246a-246n may be operated with any suitable parameters to achieve a desired volume, rate of flow, concentration, and the like of cellulose-bearing solution 124 from the second batch reactor 122b.

A solution pump 248 may optionally be included in the second batch reactor 122b or coupled to the second batch reactor 122b. Such pump 248 may be along the lines of pump 218 (FIG. 2C). Such pump 248 may be arranged to draw pre-coagulation bath cellulose-bearing solution 124a into the coagulation bath 126.

Coagulation bath 126 is described in detail with respect to FIGS. 2A, 2B. Coagulation batch 126 is arranged to receive pre-coagulation bath cellulose-bearing solution 124a and provide post-coagulation bath cellulose-bearing solution 124b to a wet spinning spinneret subsystem 128. The wet spinning spinneret subsystem 128 is described in detail with respect to FIGS. 2A, 2B. The wet spinning spinneret subsystem 128 produces a thread 262 (e.g., a cotton thread that is substantially indistinguishable from thread produced from virgin cotton fibers).

A byproduct of the coagulation bath reservoir besides the precipitated cellulose particles formed as a post-coagulation bath cellulose-bearing solution 124b is an ionic liquid and water solution 260. The ionic liquid and water solution 260 is processed in an extraction filter 250.

The extraction filter 250 in some cases is a reverse osmosis filter. In such a filter, water is separated or otherwise extracted from ionic liquid via a low-pressure, low-energy or no-energy reverse osmosis filter. Other extraction filter architectures are contemplated. One output from the extraction filter 250 is water 266, which may be recycled, and another output from the extraction filter 250 is ionic liquid 264, which is further processed and re-used.

The ionic liquid 264 from the extraction filter 250 is further processed in a recovery filter 252. Solid material or other material having limited commercial value, if any, is disposed material 144 (FIGS. 2A, 2B). The further cleaned ionic liquid 268 passed through an ionic liquid purification structure 254. Some ionic liquid 230 is stored in an ionic liquid receptacle 256; other ionic liquid 230 is withdrawn from the ionic liquid receptacle 256. The ionic liquid 230 is received in the distribution switch 244 to create the flowable feedstock 222 slurry.

Figure 3:
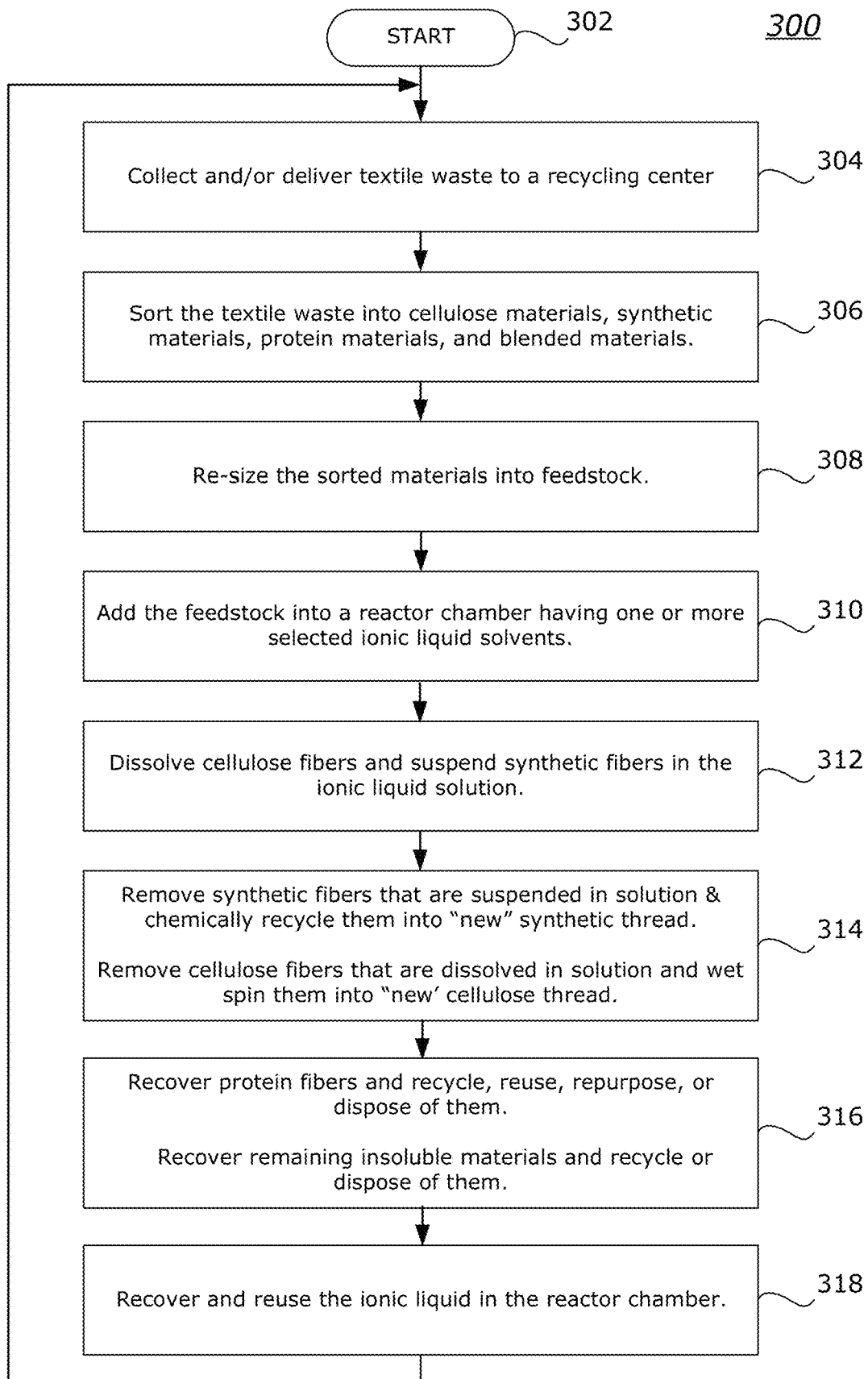
FIG. 3 is a data flow diagram representing a workflow through a unified textile recycling system embodiment.

FIG. 3 is a data flow 300 diagram representing a workflow through a unified textile recycling system embodiment such as may be carried out according to the system 100A embodiment of FIG. 2A or the system 100B embodiment of FIG. 2B. In many cases, some or all of the computing structures of systems 100A, 100B, which include the controller 146, the computing network 154, the computing servers 156, and the databases 158, cooperate to direct operations of a unified recycling workflow 106a-106d (FIGS. 2A-2D). In some cases, the controller 146 may be integrated with the unified recycling workflow 106a-106d. Alternatively, as indicated by the dashed lines of the controller 146, the controller 146 or at least certain portions of the controller may be arranged remote from the unified recycling workflow.

At 302, processing begins. The processing may include initialization of controller 146 and initialization of one or more subsystems of the unified recycling workflow 106a-106d. For example, communications between subsystems may be tested; vessels (e.g., chambers, troughs, reactors, receptacles, basins, bins, and the like) may be purged, cleaned, filled, or otherwise initialized; fans may be started or otherwise tested; heating elements may be started or otherwise tested; and sensors may be calibrated or otherwise prepared with initial data. In some cases, one or more vessels of a cellulose solvent reactor may be preloaded with a selected volume of a particular ionic liquid or a blend of ionic liquids, and in these cases, zero or more other elements (e.g., water, acid, salt, dye, a chemical identifier, or some other element or elements) may also be added. If a chemical identifier is added, the chemical identifier may be arranged as a particular inert chemical chain that can act as a trademark to uniquely identify the manufacturer of the recycled textile. Processing advances to 304.

At 304, textile waste is collected, delivered, or otherwise positioned at a recycling center. The textile waste may be delivered from municipalities, fabric mills, clothing factories, surplus clothing stores, brand manufacturers, retailers, and the like. The textile waste may be delivered with recycling trucks, dump trucks, vans, cars, bicycles, trains, ships, or any other suitable means of transport. At the recycling center, the material may be weighed, manually sorted based on any particular parameter (e.g., weight, physical size, color, type of article, state of cleanliness, state of dryness (e.g., humidity), or any other suitable parameter), stacked, piled, layered, or arranged for entry into the unified recycling workflow in any suitable way. Preparing the textiles-to-be-recycled in this way may improve the recycling process by reducing the time to dissolve, reducing the amount of energy required to recycle, increasing the yield, and the like.

In some cases, controller 146 may be communicatively coupled with any suitable number of sensors 150 (e.g., motion detectors, load cells, timers, conveyors, robotics, material handlers, and the like) to facilitate receipt of the textile waste. Human personnel may operate user input sensors to facilitate the textile waste intake operations. Processing advances to 306.

At 306, the textile waste is sorted. In at least some cases, the textiles-to-be-recycled are sorted and processed as distinct batches of cellulose materials, synthetic materials, protein materials, and blended materials. The sorting may be performed by an optical sorting subsystem 110, a chemical sorting subsystem, a weighing sorting subsystem, or some other type of sorting paradigm that is communicatively coupled to controller 146. Processing may be fully or partially automated. Processing may or may not have human input. In at least one case, sensors 150 of the optical sorting subsystem are arranged to capture one or more images or other characteristics of the textiles-to-be-recycled using a particular type of camera (e.g., one or more of forward looking infrared (FLIR) cameras, Fourier transform infrared (FTIR) cameras, or some other infrared-technology-based cameras). Such cameras, which may also be referred to as one or more of sensors 150, are arranged to independently or cooperatively, with controller 146, create a digital signature (e.g., an optical digital signature, a microscopy-based digital signature, a spectrographic-based digital signature, or some other digital signature) representative of the subject textiles.

In at least one case, the created optical digital signature may be formed in any suitable way using, for example, spectrographic data. Controller 146 may direct various computational operations to compare the created optical digital signature to a set of optical digital signatures stored in database 158. The optical digital signatures stored in database 158 may each represent a different textile or textile blend among other things. If a match is found (e.g., an optical digital signature representing some or all of the textiles-to-be-recycled is identical or substantially the same as an optical digital signature stored in the database 158), then one or more sensors 150 may be used to direct how the textiles-to-be-recycled are processed. For example, if the textiles-to-be-recycled include cellulose-bearing materials, then the textiles-to-be-recycled are passed into the cellulose solvent reactor 122. In another example, if the textiles-to-be-recycled include only non-cellulose materials 112, then the textiles-to-be-recycled are directed for non-cellulose material processing 114. Accordingly, one or more sensors 150 of the optical sorting system may be used to control conveyors, gates, pumps, valves, fans, motors, suction, filters, timers, or any electronically controllable circuits.

In at least one other case, the sorting is based on a chemical analysis of the textiles-to-be-recycled. A chemical sorting system may be communicatively coupled to controller 146 and arranged to perform actions along the lines of an optical sorting subsystem 110 albeit based on chemical analysis rather than optical analysis. Such chemical analysis may be used to determine if the textiles-to-be-recycled include cellulose-bearing materials, synthetic-bearing materials, protein-bearing materials, or some other type of material. Along the lines of optical sorting subsystem 110, data from the chemical analysis may be used to create a chemical digital signature, which is then compared to other chemical digital signatures stored in database 158. Further along the lines of the optical sorting subsystem 110, the results of such comparison may then be used to direct one or more sensors in the unified recycling workflow 106a-106d. Such direction may determine the acts performed on at least some of the textiles-to-be-recycled.

In still other cases, some of the textiles-to-be-recycled include materials that have been treated with fire retardants, water repellent chemicals, insecticides, biological pathogen resistant chemicals, and the like (e.g., KEVLAR, GORE-TEX, and the like). Certain sensors 150 may be arranged to detect such substances. In some cases, textiles can be processed as taught in the present disclosure while retaining the particular chemical properties. In other cases, textiles-to-be-recycled having these less-common chemicals are disposed of using traditional disposal methods.

Based on the sorting, one or more batches of textiles-to-be-recycled 108 are advanced for further recycling. In some cases, for example, controller 146 directs conveyors, channels, gates, pumps, valves, robotics, or any other suitable structures to move the textiles-to-be-recycled. In these or other cases, controller 146 may cooperate with human interface sensors 150 to indicate action is necessary and to accept human or machine input reporting that particular action has been taken. Processing advances to 308.

At 308, the sorted materials are optionally re-sized into feedstock 120. A re-sizing subsystem 118, for example, may optionally be used to prepare the cellulose-based materials 116 for any one or more of: improved cellulose dissolution, faster cellulose dissolution, lower-energy cellulose dissolution, larger-batch cellulose dissolution, or for other reasons. In at least some cases, the re-sizing may be referred to as pretreating, preparing, batching, or some other like term. Operations of such pretreatment may be directed by controller 146 and cooperative sensors 150.

Controller 146 may also operate valves, actuators, sensors, and the like to move or otherwise position materials within the unified recycling workflow 106a-106d for placement into one or more reactors. The pretreated material from the re-sizing subsystem 118, for example, is passed as feedstock 120 toward a cellulose solvent reactor 122. The feedstock 120 will contain cellulose-based fibers. In some cases, the feedstock 120 will also contain at least one of synthetic fibers, animal fibers, and non-fibrous materials (e.g., silicates, silicate salts, raw metals, oil, water, and the like). Processing advances to 310.

At 310, the feedstock is added into a reactor chamber having one or more selected ionic liquid solvents. The reactor chamber may be a cellulose solvent reactor 122 or some other reactor chamber. In the embodiments described in the present disclosure, a reactor chamber (e.g., cellulose solvent reactor 122) is arranged to contain one or more ionic liquids and further arranged to accept materials (e.g., textiles, cellulose, blends, and the like) on which the ionic liquids will act. In some cases, the ionic liquid or liquids are present in the reactor chamber when the feedstock 120 is added. In some cases, the feedstock 120 is present in the reactor chamber when the ionic liquid or liquids are added. In still other cases, the feedstock 120 and the ionic liquid or liquids are added at approximately a same time. To carry out such actions, controller 146 may cooperate with sensors 150, which are arranged as volume sensors, weight sensors, motion detectors, motors, pumps, valves, ports, timers, thermometers, viscosity sensors, pressure sensors, and the like.

In some cases, the reactor chamber may have one, two, or any suitable number of separate and distinct reservoirs (e.g., vessels, chambers, wells, troughs, or the like). Separate and distinct reservoirs of a reactor chamber may cooperate for sequential processing of feedstock 120. For example, feedstock 120 may be arranged within a first vessel under certain parameters (e.g., time, temperature, pressure, agitation, viscosity, and the like) that are managed by controller 146, and the same feedstock 120, or that portion that remains, may be later moved into a second vessel for additional processing, a third vessel for still more processing, and so on. Alternatively, under the direction of controller 146, a reactor chamber may have one or more separate and distinct reservoirs that have one or more inlet ports, outlet ports, pumps, valves, and other suitable means so that sequential processing may occur in a same reservoir with sequentially different sets of parameters. That is, in some cases, a reactor chamber may concurrently contain feedstock 120 and a first ionic liquid or blend of ionic liquids and processing occurs under a certain first set of parameters. Subsequently, the same feedstock 120 or a remainder of said feedstock is processed using a second ionic liquid or blend of ionic liquids and processing occurs under a certain second set of parameters.

A reactor chamber may be arranged as a reservoir (e.g., a bowl, a basin, a trough, a well, a receptacle, or any other structure suitable to contain a desired amount of ionic liquid, feedstock, and other materials, if any). The reactor chamber may in some cases have a volume of between sixty-four fluid ounces (64 fl. oz.) and five gallons (5 gal.). In other cases, the reactor chamber may have a volume of between five gallons (5 gal.) and five thousand gallons (5000 gal.). In still other cases, the reactor chamber may have a volume less than sixty-four fluid ounces (64 fl. oz). And in still other cases, the reactor chamber may have a volume of more than five thousand gallons (5000 gal.).

In some cases, before a feedstock 120 is subjected to an ionic liquid bath, the feedstock may optionally be further pre-processed by various sensors 150 and other structures of controller 146. For example, one or more acts of immersing the feedstock 120 in an aqueous NaOH solution at a selected temperature, agitating the feedstock, washing the feedstock with, for example, deionized water until a neutral pH is regained, and drying the feedstock using, for example, an oven, a radiant heating element, a forced air system, or some other drying means may be performed. In such cases, a selected temperature may be between about ten degrees Celsius (10° C.) and about one-hundred fifty degrees Celsius (150° C.). In some cases, the selected temperature is about ninety degrees Celsius (90° C.). In other cases, a selected temperature is less than about ten degrees Celsius (10° C.) or more than about one-hundred fifty degrees Celsius (150° C.). In some cases, the selected temperature is room temperature.

After pre-treating, if any, and which may optionally include any or all of the acts of immersion, washing, pH balancing, and drying, the feedstock 120 is subjected to an ionic liquid solution. The ionic liquid solution may include a single ionic liquid in some cases, and the ionic liquid may include two or more ionic liquids in other cases. The ionic liquid solution may consist of only one or more ionic liquids in some cases, and the ionic liquid solution may consist of one or more ionic liquids along with some other material in other cases. In some cases, an ionic liquid solution selected for use in the reactor chamber is dried thoroughly to less than 0.2% water.

The ionic liquids used in one or more embodiments of the unified recycling workflow 106a-106d embodiments taught herein include at least one of imidazolium compound ionic liquids, oxide acetate compound ionic liquids, and methyl oxide compound ionic liquids. Ionic liquids are attractive for the dissolution of cellulose because certain physical properties of ionic liquids can be tailored by the selection of ions and substituents on the R cation group for the selected parameters of a specific cellulose fiber, and the degree of polymerization.

In some cases, a selected ionic liquid solution includes one or more of N-Methylmorpholine-N-oxide (NMMO), 1-Allyl-3-methylimidazolium chloride (AMIM-CL), 1-butyl-3-methylimidazolium acetate (BMIM-OAc), however, other ionic liquids are contemplated. It has been learned by the inventors that none of NMMO, AMIM-CL, and BMIM-OAc dissolve polyester. It has been further learned that AMIM-CL dissolves cotton components of cotton/polyester blends at higher yields than BMIM-OAc, and that both AMIM-CL and BMIM-OAc ionic liquids, when used in commercial processes taught in the present disclosure, can produce recovered cellulose and polyester fibers at very high yields. Accordingly, in various embodiments, any ionic liquid solutions containing NMMO, AMIM-CL, and BMIM-OAc may be selected for dissolution of cellulose-bearing textile and blends containing a mix of cellulose and synthetic fibers.

In some cases, a solution for dissolving cellulose consists of a solvent, such as Dimethyl sulfoxide (DMSO), and an ionic liquid such as one or more of NMMO, AMIM-CL, BMIM-OAc, or some other ionic liquid. As taught in the present disclosure, the inclusion of DMSO or some other material as a cosolvent changes rheological properties (e.g., viscosity, thermal response properties, cellulose-fiber yield, time-response properties, and the like) of the solution after dissolving the cellulose, which permits the resulting solution to be used as a desirable spinning dope for various applications. In at least some cases, viscosity may also be controlled using ozone, hydrogen peroxide, Dimethylformamide (DMF), gamma-Butyrolactone (GBL), N-Methyl-2-pyrrolidone (NMP), Dimethylacetamide (DMAc), or some other material.

Processing advances to 312.

At 312, cellulose fibers are dissolved in the ionic liquid solution, and synthetic fibers are suspended in the ionic liquid solution. As in other operations of the unified recycling workflow 106a-106d, controller 146 may pass control signals to various sensors 150 and receive data from various sensors 150 to control the dissolution process. Such control may optionally include management and control of any suitable heating structures, cooling structures, agitators, valves, ports, gates, inlets, outlets, motion detectors, fluid sampling sensors, timers, power supplies, robotics, and the like.

In some cases, the feedstock 120 is dissolved in an ionic liquid solution at a selected temperature for a selected amount of time. In at least one case, the solvent and ionic liquid solution is a 1:4 DMSO and BMIM-OAc solution, the selected temperature is about eighty degrees Celsius (80° C.), and the selected amount of time is about thirty minutes (30 min.). In some cases, the selected temperature is between about ten degrees Celsius (10° C.) and about one-hundred-seventy-five degrees Celsius (175° C.). In other cases, the selected temperature may be between about sixty degrees Celsius (60° C.) and about one hundred degrees Celsius (100° C.), however temperatures below about sixty degrees Celsius (60° C.) and above about one hundred degrees Celsius (100° C.) are contemplated. In at least one case, the selected temperature is room temperature. In these and other cases, the selected time may be between about five minutes (5 min.) and about two hours (2 hr.), however times below five minutes (5 min.) and above two hours (2 hr.) are also contemplated. In some cases, the time in solution was between about five minutes (5 min.) and about ten hours (10 hr.). In these and other cases, the time in solution was more than about thirty minutes (30 min.) or less than about eight hours (8 hr.). In at least one exemplary case, the time in solution was about six hours (6 hr.), and in at least one other exemplary case, the time in solution was less than two hours (2 hr.).

Processing advances to 314.

At 314, Synthetic fibers suspended in solution are removed and chemically recycled into "new" synthetic thread, and cotton fibers dissolved in solution are removed and wet spun into "new" cellulose thread.

Exemplary synthetic fibers include, but are not limited to, polyester, nylon, acrylic, polyolefin, and the like. The synthetic fibers, which are suspended in the solution of the cellulose solvent reactor 122, are in some cases vacuum extracted at the direction of controller 146. Other known means may also be used to remove the suspended synthetic fibers from the cellulose solvent reactor 122. In some cases, the synthetic fibers are filtered, rinsed with deionized water, or treated in other known ways. The previously suspended synthetic fibers are spun in some cases onto a first industry standard bobbin. In other cases, the synthetic fibers are combined with other fibers or filaments to produce a hybrid textile. In at least some cases, recycled cellulose materials from a first wet spinning spinneret subsystem 128 may be optionally combined with recycled synthetic materials from a second solution reservoir 136a to produce a particular hybrid fiber product.

Exemplary cellulose fibers include, but are not limited to, cotton, linen, rayon, hemp, jute fibers, lyocell, bamboo, reed, and the like. After being acted on by the ionic liquid solution in the cellulose solvent reactor 122, the cellulose fibers are dissolved to form a cellulose-bearing solution 124. The cellulose-bearing solution 124 may have any desirable concentration of cellulose. In some cases, the cellulose-bearing solution 124 contains more than one half of one percent (0.5%) cellulose fibers. In some cases, the cellulose-bearing solution 124 contains about one to two percent (1-2%) cellulose fibers. In other cases, the cellulose-bearing solution 124 contains more than two percent (2%) cellulose fibers. In still other cases, the cellulose-bearing solution 124 contains less than five percent (5%), less than ten percent (10%), less than twenty-five percent (25%), less than fifty percent (50%), or some other percentage less than one hundred percent (100%) cellulose fibers. In some cases, after removing (e.g., via filtering or some other method) some or all of the non-cellulose content (e.g., the synthetic content, protein content, insoluble content, and the like), the cellulose-bearing solution 124 may be further concentrated. In one case, the cellulose-bearing solution 124 is concentrated to fifteen to seventeen percent (15-17%) cellulose fibers using, if necessary, stock fibers. Alternatively, or in addition, the cellulose-bearing solution 124 may be concentrated to more than five percent (5%), more than ten percent (10%), more than twenty-five percent (25%), and even more than fifty percent (50%) cellulose fibers, using stock fibers if necessary. Such processes are performed at the direction of controller 146 and any suitable sensors 150.

The cellulose-bearing solution 124 may be created to have rheological properties that render such cellulose-bearing solution 124 appropriate for use in wet spinning without further processing. Accordingly, the cellulose-bearing solution 124 may also be referred to as a spinning dope.

The spinning dope, as directed by controller 146, is poured, injected, or otherwise arranged in a cellulose coagulation bath reservoir 126, which includes a liquid, such as water, deionized water, or some other liquid. When the spinning dope is introduced into the cellulose coagulation bath reservoir 126, the cellulose fibers begin to coagulate. The coagulating fibers are drawn out from the cellulose coagulation bath reservoir 126 and into a wet-spinning spinneret subsystem 128 and extruded from the spinneret as one or more continuous threads, yarns, or another filament. In some cases, the filament is wound on an industry standard bobbin. In some cases, two or more types of cellulose-based filament are combined to form a particular class of hybrid filament.

In some embodiments, two or more separate and distinct types of cellulose-based fibers are formed in a single batch process. The two or more separate and distinct types of cellulose-based fibers may be formed by dissolving feedstock 120 in a first process, a second process, and any suitable number of processes. Each different process may dissolve the feedstock 120 under different conditions (e.g., different ionic liquids, different temperatures, different pressures, different time duration, different agitation, different cosolvent, and the like) as directed by controller 146 and cooperative sensors 150. In cases such as this, a unified recycling workflow 106a-106d may have one or more cellulose solvent reservoirs, one or more cellulose coagulation bath reservoirs, and one or more wet spinneret subsystems. Resulting threads may be wound on a same or separate industry standard bobbins.

The recovery of synthetic fibers and cellulose fibers may also include acts associated with a color of the resulting filament. In some cases, an original color of the textiles-to-be-recycled 108 is retained; in other cases, a new color can be added, and in still other cases, all color may be removed, for example by bleaching, to permit recycled materials to have a completely natural color state. When new coloring is desired, the new color may be provided by an act of dyeing.

Processing advances to 316.

At 316, controller 146 directs operations associated with protein fibers and insoluble items. Protein fibers, for example, are recovered and recycled, reused, repurposed, or disposed of, and any remaining insoluble items are recovered and recycled or disposed of.

In some cases, heavier-than-liquid materials (e.g., zippers, buckles, clasps, buttons, rivets, wires, supports, hook-and-loop sub-systems, coins, gems, decorations, elastics, paper, rubber, gum, adhesives, fire retardants, water repellant chemicals, insect repellant chemicals, pathogen-destructive chemicals, dirt, food, plastics, and the like) will sink to the bottom of the cellulose solvent reactor 122, cellulose coagulation bath reservoir 126, second solution reservoir 136a, and insoluble materials receptacle 136b. Such materials may be removed with a one or more magnets, filters, screens, sweepers, or some other mechanism, which may be operated manually or at the control and management of controller 146. Such items may be recycled or otherwise disposed of in known ways. For example, disposal may include chemical processing, high temperature processing (e.g., incineration, melting, vitrification, and the like), re-purposing (e.g., processing into insulation, cardboard, cushion filling, foams, or the like), re-use in industry, or as often a last resort, traditional landfill disposal. Upon study, however, the inventors believe that last resort landfill volumes are likely to be only a tiny fraction of the original waste stream volume and such waste is likely to involve materials that do not decay into greenhouse gases or nano plastic particles.

In some cases, after cellulose and synthetic fibers are removed, protein fibers are strained out from the remaining liquid. The protein fibers may be removed and recovered by a separate process. For example, the protein fibers may be strained through a filter, collected on a membrane, vacuumed, centrifuged, or extracted in some other known way. Collected protein fibers are in some cases mechanically compressed into a wool felt mat. Such mats can be carded and spun with tradition wool processes.

Processing advances to 318.

At 318, the ionic liquid is recovered and reused in the reactor chamber. The ionic liquids employed in the unified recycling workflow 106a-106d of the present disclosure are nonvolatile and not depleted or consumed in the cellulose solvent reactor or any other receptacle in the unified recycling workflow 106a-106d. When feedstock is processed and advanced from the cellulose reactor chamber to another receptacle, some of the ionic liquid may also be moved. After fibers or other materials are recovered, the ionic liquid may be returned, for example via an ionic liquid recovery path, to the cellulose solvent reactor or some other repository. Recovery of the ionic liquid may include operating one or more heating elements, vents, and other structures to boil off water or other materials from the ionic liquids.

The operations performed in the data flow 300 are ongoing. Processing returns to 304.

Having now set forth certain embodiments, further clarification of certain terms used herein may be helpful to providing a more complete understanding of that which is considered inventive in the present disclosure.

In the embodiments of present disclosure, one or more particular materials and fluids are arranged to flow in one or more chambers, receptacles, reactors, vessels, and the like, and such structures may be partially or entirely controlled by an electronic control system. The various components and devices of the embodiments are interchangeably described herein as "coupled," "connected," "attached," and the like. It is recognized that once assembled, the system is arranged as a unified recycling system comprised of two or more subsystems, some of which may be optional. The materials and the junctions formed at the point where two or more structures meet in the present embodiments are sealed to a mechanically, medically, commercially, or otherwise industrially acceptable level.

FIG. 3 includes a data flow diagram illustrating a non-limiting process that may be used by embodiments of a unified recycling workflow. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as one or more components of the first and second unified textile recycling systems 100A, 100B. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments that include or otherwise cooperate with one or more computing devices. It is recognized that these computing devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, pH meters, electrical capacitance or conductance circuits, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

Amongst other things, the exemplary computing devices of the present disclosure (e.g., controller 146, computing network 154, computing servers 156, and databases 158) may be configured in any type of mobile or stationary computing device such as a remote cloud computer, a computing server, a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device (e.g., factory robotic device, home-use robotic device, retail robotic device, office-environment robotic device), or the like. Accordingly, the computing devices include other components and circuitry that is not illustrated, such as, for example, a display, a network interface, memory, one or more central processors, camera interfaces, audio interfaces, and other input/output interfaces. In some cases, the exemplary computing devices may also be configured in a different type of low-power device such as a mounted video camera, an Internet-of-Things (IoT) device, a multimedia device, a motion detection device, an intruder detection device, a security device, a crowd monitoring device, or some other device.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of textile recycling, but other techniques and tools remain available to address textile waste. Therefore, the claimed subject matter does not foreclose the whole or even substantial textile recycling technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific unified recycling workflow system features claimed herein. The embodiments described in the present disclosure improve upon known textile recycling processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform textile recycling operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the textile recycling systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the controller 146 may communicate with other devices via communication over a computing network 154. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the controller 146. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of a unified recycling workflow system.

Buttons, keypads, computer mice, memory cards, serial ports, bio-sensor readers, touch screens, and the like may individually or in cooperation be useful to a scientific practitioner operating the unified recycling workflow system. The devices may, for example, input control information into the system. Displays, printers, memory cards, LED indicators, temperature sensors, audio devices (e.g., speakers, piezo device, etc.), vibrators, and the like are all useful to present output information to the scientific practitioner operating the unified recycling workflow system. In some cases, the input and output devices are directly coupled to the controller 146 and electronically coupled to a processor or other operative circuitry. In other cases, the input and output devices pass information via one or more communication ports (e.g., RS-232, RS-485, infrared, USB, etc.).

As described herein, for simplicity, a unified recycling workflow may in some cases be described in the context of the male gender. It is understood that a unified recycling workflow can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds, milliseconds, minutes, or hours), and that the activity may be performed on an ongoing basis (e.g., sorting, dissolving cellulose materials, and the like). An example of an activity that is not real-time is one that occurs over an extended period of time (e.g., days, weeks, months, or years) or that occurs based on intervention or direction by a unified recycling workflow or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a cellulose solvent reactor may be described as being formed or otherwise oriented "substantially vertical," In these cases, a reactor that is oriented exactly vertical is oriented along a "Z" axis that is normal (i.e., 90 degrees or at right angle) to a plane formed by an "X" axis and a "Y" axis. Different from the exact precision of the term, "vertical," the use of "substantially" to modify the characteristic permits a variance of the "vertical" characteristic by up to 30 percent. Accordingly, a cellulose solvent reactor that is oriented "substantially vertical" includes cellulose solvent reactors oriented between 63 degrees and 117 degrees. A cellulose solvent reactor that is oriented at 45 degrees of an X-Y plane, however, is not mounted "substantially vertical." As another example, a cellulose solvent reactor having a particular linear dimension of "between about three feet (3 ft.) and five feet (5 ft.)" includes such devices in which the linear dimension varies by up to 30 percent, Accordingly, the particular linear dimension of the cellulose solvent reactor may be between one point five feet (1.5 ft.) and six point five feet (6.5 ft.).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being"on," "coupled to," or"connected to" another element, the elements can be directly on, directly coupled to, or directly connected to each other, or intervening elements may be present. In contrast, when an element is referred to as being"directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

It is estimated that the United States produces between ten and twenty million metric tons of textile waste each year. Globally, it is estimated that nearly one hundred million tons of textiles are discarded every year, and projections indicate this number will reach nearly one hundred fifty tons per year by 2030. Currently, only a small percentage of this textile waste is reused; mostly by shredding the waste and using it for insulation or for filler. It is estimated that less than one percent of textile waste is chemically recycled into new fibers. Instead, most of the textile waste today is dumped in expensive landfills. The costs to dispose of this waste is estimated to be about one billion dollars every year in the United States, and in Europe, where landfill costs significantly higher than the US, it is estimated over eight billion dollars. Proposed new European Union regulations, however, are expected to prevent landfill disposal of any fabrics or the transfer of any waste to other countries.

Most textile waste dumped into landfills are formed of cotton, polyester, and mixed cotton and polyester blends. Cotton decays quickly into water and two destructive greenhouse gases, methane and carbon dioxide. Polyester does not decay; instead it decomposes into microplastic particles that can migrate into the surrounding ecosystem. Microplastics have been linked to hormone variability in humans, and they are suspected of affecting fertility and contributing to childhood obesity, autoimmune diseases, and certain cancers. Further, countries such as China and Indonesia that have traditionally taken US and European fabric waste are now reducing or have terminated this practice. A few counties such as Chile continue to receive textile waste, but such waste is not processed. Instead, it is simply stored in enormous piles on the deserts in the Andes mountain region. Many environment groups condemn this practice.

The textile recycling systems described in the present disclosure provide several technical effects and advances to the field of textile waste disposal. Technical effects and benefits include the ability to completely recycle cellulose and synthetic fabric waste into new fibers that are commercially indistinguishable from virgin fibers. The teaching of the present disclosure addresses the problem of textile waste by using ionic liquids and other chemical processes in a single, closed loop workflow to recycle textiles. Embodiments of the systems, devices, and methods disclosed herein reduce energy use and improve environmental stewardship by reducing greenhouse gasses generated during landfill decomposition and by reducing the need to farm and manufacture brand new textiles at a commercially acceptable price.

For example, in at least one embodiment, textile waste is collected and delivered to a recycling center loading dock. The waste is then sorted by a novel and non-obvious optoelectronic method into pure cotton, pure polyester, pure protein, and cotton blends. In the case of cotton-polyester blends, the sorted materials are shredded into small particles and added to a reactor chamber having one or more selected ionic liquid solvents. Once cellulose fibers are dissolved, and once polyester fibers are suspended in solution, polyester fibers are removed via filtration, and cotton fibers are removed via wet spinning. Both polyester filament and cotton filament are then wound on industry standard bobbins and prepared for sale. After removing cotton and polyester fibers, protein fibers are strained out and recovered by a separate process, insoluble items (e.g., metal clasps, buckles, buttons, rivets, zippers, and the like) are extracted and recycled, and the ionic liquid is recovered reused in the reactor chamber.

The present disclosure sets forth details of various structural embodiments that may be arranged to carry the teaching of the present disclosure. By taking advantage of the unified recycling workflow described herein, a number of exemplary systems, devices, and methods are now disclosed.

Example A-1 is a textile recycling method, comprising receiving textiles-to-be-recycled; sorting the textiles-to-be-recycled to isolate cellulose-containing articles from non-cellulose-containing articles; re-sizing at least some of the cellulose-containing articles to create feedstock; processing the feedstock in a cellulose solvent reactor having at least one ionic liquid therein to create a spinning dope, wherein the processing includes dissolving, at least partially, some or all intermolecular cellulose bonds of the feedstock thereby creating a cellulose-bearing solution having cellulose fibers dissolved in the at least one ionic liquid; extruding the spinning dope in a cellulose coagulation bath reservoir to reconstitute at least some of the dissolved cellulose fibers; and wet-spinning at least some of the reconstituted cellulose fibers into a continuous cellulose filament.

Example A-2 may include the subject matter of Example A-1, and alternatively or additionally any other example herein, further comprising: vacuum-extracting or mechanically filtering insoluble materials from the cellulose solvent reactor; separating synthetic fiber material from the insoluble materials; and recycling the synthetic fiber material into a continuous synthetic filament.

Example A-3 may include the subject matter of any of Examples A-1 to A-2, and alternatively or additionally any other example herein, and further comprising initializing a computing controller, the computing controller arranged to direct operations of the textile recycling method.

Example A-4 may include the subject matter of any of Examples A-1 to A-3, and alternatively or additionally any other example herein, and further comprising preloading a selected volume of a particular ionic liquid in the cellulose solvent reactor.

Example A-5 may include the subject matter of any of Examples A-1 to A-4, and alternatively or additionally any other example herein, and further comprising preloading a selected volume of a particular blend of two or more ionic liquids in the cellulose solvent reactor.

Example A-6 may include the subject matter of any of Examples A-1 to A-5, and alternatively or additionally any other example herein, wherein receiving the textiles-to-berecycled includes one or more of: weighing, manually sorting based on weight, physical size, color, type of article, state of cleanliness, or state of dryness, stacking, piling, or layering.

Example A-7 may include the subject matter of any of Examples A-1 to A-6, and alternatively or additionally any other example herein, and further comprising generating at least one digital signature representative of at least one property of at least some of the textiles-to-be-recycled, comparing the at least one generated digital signature to a stored digital signature, and directing processing of the at least some of the textiles-to-be-recycled based on a result of the comparing.

Example A-8 may include the subject matter of any of Examples A-1 to A-7, and alternatively or additionally any other example herein, and further comprising, based on the sorting, directing operation of at least one conveyor, gate, pump, valve, fan, motor, suction, filter, or timer.

Example A-9 may include the subject matter of any of Examples A-1 to A-8, and alternatively or additionally any other example herein, and further comprising, based on the sorting, directing operation of at least one electronically controllable circuit.

Example A-10 may include the subject matter of any of Examples A-1 to A-9, and alternatively or additionally any other example herein, and further comprising, based on the sorting, directing recycling operations of cellulose-bearing materials.

Example A-11 may include the subject matter of any of Examples A-1 to A-10, and alternatively or additionally any other example herein, and further comprising, based on the sorting, directing recycling operations of synthetic-bearing materials.

Example A-12 may include the subject matter of any of Examples A-1 to A-11, and alternatively or additionally any other example herein, and further comprising, based on the sorting, directing recycling operations of protein-bearing materials.

Example A-13 may include the subject matter of any of Examples A-1 to A-12, and alternatively or additionally any other example herein, and further comprising, based on the sorting, directing recycling operations of insoluble materials.

Example A-14 may include the subject matter of any of Examples A-1 to A-13, and alternatively or additionally any other example herein, and further comprising, based on the sorting, generating at least one of a first digital signature representing cotton material, a second digital signature representing polyester material, a third digital signature representing a particular blend of cotton and polyester, a fourth digital signature representing a certain leather material, and a fifth digital signature representing a certain paper material, and directing a conveyance mechanism to move at least some of the textiles-to-be-recycled.

Example A-15 may include the subject matter of any of Examples A-1 to A-14, and alternatively or additionally any other example herein, and further comprising storing a plurality of digital signatures in a database wherein each signature of the plurality of digital signatures represents a material having a particular molecular structure.

Example A-16 may include the subject matter of any of Examples A-1 to A-15, and alternatively or additionally any other example herein, and further comprising storing a plurality of digital signatures in a database wherein each signature of the plurality of digital signatures represents a material having a particular molecular structure, wherein the particular molecular structure includes at least one of pure cellulose, pure synthetic, pure protein, a blend of cellulose and at least one other element, a blend of cellulose and polyester.

Example A-17 may include the subject matter of any of Examples A-1 to A-16, and alternatively or additionally any other example herein, and further comprising storing a plurality of digital signatures in a database wherein each signature of the plurality of digital signatures represents a material having a particular molecular structure, wherein the particular molecular structure includes at least one of pure cellulose fibers, a majority of the pure cellulose fibers having a selected minimum length.

Example A-18 may include the subject matter of any of Examples A-1 to A-17, and alternatively or additionally any other example herein, and further comprising storing a plurality of digital signatures in a database wherein each signature of the plurality of digital signatures represents a material having a particular color.

Example A-19 may include the subject matter of any of Examples A-1 to A-18, and alternatively or additionally any other example herein, and further comprising receiving the at least one ionic liquid into the cellulose solvent reactor through an inlet port.

Example A-20 may include the subject matter of any of Examples A-1 to A-19, and alternatively or additionally any other example herein, and further comprising receiving a second ionic liquid into the cellulose solvent reactor.

Example A-21 may include the subject matter of any of Examples A-1 to A-20, and alternatively or additionally any other example herein, and further comprising, as part of the processing, passing the feedstock or a portion of the feedstock from a first reservoir of the cellulose solvent reactor into a second reservoir of the cellulose solvent reactor.

Example A-22 may include the subject matter of any of Examples A-1 to A-21, and alternatively or additionally any other example herein, and further comprising, as part of the processing, agitating the cellulose solvent reactor or materials within the cellulose solvent reactor.

Example A-23 may include the subject matter of any of Examples A-1 to A-22, and alternatively or additionally any other example herein, and further comprising, as part of the processing, agitating the cellulose solvent reactor or materials within the cellulose solvent reactor for a determined period of time.

Example A-24 may include the subject matter of any of Examples A-1 to A-23, and alternatively or additionally any other example herein, and further comprising, as part of the processing, heating the cellulose solvent reactor or materials within the cellulose solvent reactor.

Example A-25 may include the subject matter of any of Examples A-1 to A-24, and alternatively or additionally any other example herein, and further comprising, as part of the processing, heating the cellulose solvent reactor or materials within the cellulose solvent reactor to a determined temperature or temperature range.

Example A-26 may include the subject matter of any of Examples A-1 to A-25, and alternatively or additionally any other example herein, and further comprising, as part of the processing, heating the cellulose solvent reactor or materials within the cellulose solvent reactor for a determined period of time.

Example A-27 may include the subject matter of any of Examples A-1 to A-26, and alternatively or additionally any other example herein, and further comprising, as part of the processing, pressurizing the cellulose solvent reactor.

Example A-28 may include the subject matter of any of Examples A-1 to A-27, and alternatively or additionally any other example herein, and further comprising, as part of the processing, pressurizing the cellulose solvent reactor to a selected pressure or pressure range.

Example A-29 may include the subject matter of any of Examples A-1 to A-28, and alternatively or additionally any other example herein, and further comprising, as part of the processing, pressurizing the cellulose solvent reactor for a determined period of time.

Example A-30 may include the subject matter of any of Examples A-1 to A-29, and alternatively or additionally any other example herein, and further comprising, as part of the processing, controlling viscosity of fluid in the cellulose solvent reactor.

Example A-31 may include the subject matter of any of Examples A-1 to A-30, and alternatively or additionally any other example herein, and further comprising, as part of the processing, controlling viscosity of fluid in the cellulose solvent reactor at least in part via addition a selected amount of ozone.

Example A-32 may include the subject matter of any of Examples A-1 to A-31, and alternatively or additionally any other example herein, and further comprising, as part of the processing, controlling viscosity of fluid in the cellulose solvent reactor at least in part via addition a selected amount of hydrogen peroxide.

Example A-33 may include the subject matter of any of Examples A-1 to A-32, and alternatively or additionally any other example herein, and further comprising, as part of the processing, immersing the feedstock in an aqueous NaOH solution at a selected temperature.

Example A-34 may include the subject matter of any of Examples A-1 to A-33, and alternatively or additionally any other example herein, and further comprising, as part of the processing, immersing the feedstock in an aqueous NaOH solution at a selected temperature.

Example A-35 may include the subject matter of any of Examples A-1 to A-34, and alternatively or additionally any other example herein, and further comprising, as part of the processing, immersing the feedstock in an aqueous NaOH solution at a temperature between about ten degrees Celsius (10° C.) and about one-hundred fifty degrees Celsius (150° C.).

Example A-36 may include the subject matter of any of Examples A-1 to A-35, and alternatively or additionally any other example herein, and further comprising, as part of the processing, immersing the feedstock in an aqueous NaOH solution at a temperature of about ninety degrees Celsius (90° C.).

Example A-37 may include the subject matter of any of Examples A-1 to A-36, and alternatively or additionally any other example herein, and further comprising, as part of the processing, immersing the feedstock in an aqueous NaOH solution at a temperature less than about ten degrees Celsius (10° C.).

Example A-38 may include the subject matter of any of Examples A-1 to A-37, and alternatively or additionally any other example herein, and further comprising, as part of the processing, immersing the feedstock in an aqueous NaOH solution at a temperature more than about one-hundred fifty degrees Celsius (150° C.).

Example A-39 may include the subject matter of any of Examples A-1 to A-38, and alternatively or additionally any other example herein, and further comprising, as part of the processing, immersing the feedstock in an aqueous NaOH solution at room temperature.

Example A-40 may include the subject matter of any of Examples A-1 to A-39, and alternatively or additionally any other example herein, and further comprising, as part of the processing, washing the feedstock with deionized water until a neutral pH is achieved.

Example A-41 may include the subject matter of any of Examples A-1 to A-40, and alternatively or additionally any other example herein, and further comprising, as part of the processing, drying the feedstock using at least one of an oven, a radiant heating element, or a forced air system.

Example A-42 may include the subject matter of any of Examples A-1 to A-41, and alternatively or additionally any other example herein, and further comprising, as part of the processing, immersing the feedstock in an ionic liquid solution that includes a single ionic liquid.

Example A-43 may include the subject matter of any of Examples A-1 to A-42, and alternatively or additionally any other example herein, and further comprising, as part of the processing, immersing the feedstock in an ionic liquid solution that includes two or more ionic liquids.

Example A-44 may include the subject matter of any of Examples A-1 to A-43, and alternatively or additionally any other example herein, and further comprising, as part of the processing, immersing the feedstock in an ionic liquid solution that includes only one or more ionic liquids.

Example A-45 may include the subject matter of any of Examples A-1 to A-44, and alternatively or additionally any other example herein, and further comprising, as part of the processing, immersing the feedstock in an ionic liquid solution that includes one or more ionic liquids and at least one other material.

Example A-46 may include the subject matter of any of Examples A-1 to A-45, and alternatively or additionally any other example herein, and further comprising, as part of the processing, immersing the feedstock in an ionic liquid solution that includes one or more of an imidazolium compound ionic liquid, an oxide acetate compound ionic liquid, and a methyl oxide compound ionic liquid.

Example A-47 may include the subject matter of any of Examples A-1 to A-46, and alternatively or additionally any other example herein, and further comprising, as part of the processing, immersing the feedstock in an ionic liquid solution that includes one or more of N-Methylmorpholine-N-oxide (NMMO), 1-Allyl-3-methylimidazolium chloride (AMIM-CL), and 1-butyl-3-methylimidazolium acetate (BMIM-OAc).

Example A-48 may include the subject matter of any of Examples A-1 to A-47, and alternatively or additionally any other example herein, and further comprising, as part of the processing, immersing the feedstock in an ionic liquid solution that includes at least one ionic liquid and at least one solvent.

Example A-49 may include the subject matter of any of Examples A-1 to A-48, and alternatively or additionally any other example herein, and further comprising, as part of the processing, immersing the feedstock in an ionic liquid solution that includes at least one ionic liquid and at least one cosolvent.

Example A-50 may include the subject matter of any of Examples A-1 to A-49, and alternatively or additionally any other example herein, and further comprising, as part of the processing, immersing the feedstock in an ionic liquid solution that includes at least one ionic liquid and at least one cosolvent, the cosolvent being at least one of Dimethyl sulfoxide (DMSO), ozone, hydrogen peroxide, Dimethylformamide (DMF), gamma-Butyrolactone (GBL), N-Methyl-2-pyrrolidone (NMP), Dimethylacetamide (DMAc), or some other material.

Example A-51 may include the subject matter of any of Examples A-1 to A-50, and alternatively or additionally any other example herein, and further comprising, as part of the processing, immersing the feedstock in an ionic liquid solution having a temperature of about eighty degrees Celsius (80° C.).

Example A-52 may include the subject matter of any of Examples A-1 to A-51, and alternatively or additionally any other example herein, and further comprising, as part of the processing, immersing the feedstock in an ionic liquid solution having a temperature between about ten degrees Celsius (10° C.) and about one-hundred-seventy-five degrees Celsius (175° C.).

Example A-53 may include the subject matter of any of Examples A-1 to A-52, and alternatively or additionally any other example herein, and further comprising, as part of the processing, immersing the feedstock in an ionic liquid solution having a temperature between about sixty degrees Celsius (60° C.) and about one hundred degrees Celsius (100° C.).

Example A-54 may include the subject matter of any of Examples A-1 to A-53, and alternatively or additionally any other example herein, and further comprising, as part of the processing, immersing the feedstock in an ionic liquid solution having a temperature that is below about sixty degrees Celsius (60° C.).

Example A-55 may include the subject matter of any of Examples A-1 to A-54, and alternatively or additionally any other example herein, and further comprising, as part of the processing, immersing the feedstock in an ionic liquid solution having a temperature that is above about one hundred degrees Celsius (100° C.).

Example A-56 may include the subject matter of any of Examples A-1 to A-55, and alternatively or additionally any other example herein, and further comprising, as part of the processing, immersing the feedstock in an ionic liquid solution for about thirty minutes (30 min.).

Example A-57 may include the subject matter of any of Examples A-1 to A-56, and alternatively or additionally any other example herein, and further comprising, as part of the processing, immersing the feedstock in an ionic liquid solution for a time between about five minutes (5 min.) and about two hours (2 hr.).

Example A-58 may include the subject matter of any of Examples A-1 to A-57, and alternatively or additionally any other example herein, and further comprising, as part of the processing, immersing the feedstock in an ionic liquid solution for a time below five minutes (5 min.).

Example A-59 may include the subject matter of any of Examples A-1 to A-58, and alternatively or additionally any other example herein, and further comprising, as part of the processing, immersing the feedstock in an ionic liquid solution for a time above two hours (2 hr.).

Example A-60 may include the subject matter of any of Examples A-1 to A-59, and alternatively or additionally any other example herein, and further comprising, as part of the processing, immersing the feedstock in an ionic liquid solution for a time between about five minutes (5 min.) and about ten hours (10 hr.).

Example A-61 may include the subject matter of any of Examples A-1 to A-60, and alternatively or additionally any other example herein, and further comprising, as part of the processing, immersing the feedstock in an ionic liquid solution for a time that is more than about thirty minutes (30 min.) or less than about eight hours (8 hr.).

Example A-62 may include the subject matter of any of Examples A-1 to A-61, and alternatively or additionally any other example herein, and further comprising, as part of the processing, immersing the feedstock in an ionic liquid solution for a time that is about six hours (6 hr.).

Example A-63 may include the subject matter of any of Examples A-1 to A-62, and alternatively or additionally any other example herein, and further comprising, as part of the processing, immersing the feedstock in an ionic liquid solution for a time that is less than about two hours (2 hr.).

Example A-64 may include the subject matter of any of Examples A-1 to A-63, and alternatively or additionally any other example herein, and further comprising, as part of the processing, immersing the feedstock in an ionic liquid solution that is dried to less than 0.2% water.

Example A-65 may include the subject matter of any of Examples A-2 to A-64, and alternatively or additionally any other example herein, and further comprising filtering the synthetic fibers to remove undesirable materials.

Example A-66 may include the subject matter of any of Examples A-2 to A-65, and alternatively or additionally any other example herein, and further comprising rinsing the synthetic fibers with deionized water.

Example A-67 may include the subject matter of any of Examples A-2 to A-66, and alternatively or additionally any other example herein, and further comprising combining the continuous synthetic filament with the continuous cellulose filament to produce a hybrid filament product.

Example A-68 may include the subject matter of any of Examples A-2 to A-67, and alternatively or additionally any other example herein, and further comprising winding the continuous synthetic filament on a first industry standard bobbin.

Example A-69 may include the subject matter of any of Examples A-1 to A-68, and alternatively or additionally any other example herein, and further comprising bleaching the cellulose fibers.

Example A-70 may include the subject matter of any of Examples A-1 to A-69, and alternatively or additionally any other example herein, and further comprising dyeing the cellulose fibers.

Example A-71 may include the subject matter of any of Examples A-1 to A-70, and alternatively or additionally any other example herein, and further comprising recovering protein fibers from the feedstock.

Example A-72 may include the subject matter of any of Examples A-1 to A-71, and alternatively or additionally any other example herein, and further comprising recovering protein fibers from the feedstock via at least one of a filter and a membrane.

Example A-73 may include the subject matter of any of Examples A-1 to A-72, and alternatively or additionally any other example herein, and further comprising collecting heavier-than-liquid materials from the cellulose solvent reactor.

Example A-74 may include the subject matter of any of Examples A-1 to A-73, and alternatively or additionally any other example herein, and further comprising collecting heavier-than-liquid materials from the cellulose solvent reactor using at least one of a magnet, a screen, and a sweeper.

Example A-75 may include the subject matter of any of Examples A-1 to A-74, and alternatively or additionally any other example herein, wherein the acts of the textile recycling method are performed in a single location.

Example A-76 may include the subject matter of any of Examples A-1 to A-75, and alternatively or additionally any other example herein, wherein the acts of the textile recycling method are performed in a single location, wherein the single location is one of a single factory, a single room, or a single housing.

Example A-77 may include the subject matter of any of Examples A-1 to A-76, and alternatively or additionally any other example herein, wherein the sorting is performed with an optical sorting subsystem.

Example A-78 may include the subject matter of any of Examples A-1 to A-77, and alternatively or additionally any other example herein, wherein the sorting is performed with an optical sorting subsystem having at least one forward looking infrared (FLIR) camera.

Example A-79 may include the subject matter of any of Examples A-1 to A-78, and alternatively or additionally any other example herein, wherein the sorting is performed with an optical sorting subsystem having at least one Fourier transform infrared camera.

Example A-80 may include the subject matter of any of Examples A-1 to A-79, and alternatively or additionally any other example herein, wherein the sorting is performed with an optical sorting subsystem having at least one infrared camera.

Example A-81 may include the subject matter of any of Examples A-1 to A-80, and alternatively or additionally any other example herein, wherein the sorting is performed with a chemical sorting subsystem.

Example A-82 may include the subject matter of any of Examples A-1 to A-81, and alternatively or additionally any other example herein, wherein the sorting is performed with a sorting subsystem that measures weight of at least some of the textiles-to-be-recycled.

Example A-83 may include the subject matter of any of Examples A-1 to A-82, and alternatively or additionally any other example herein, wherein the sorting is arranged to create at least one digital signature representative at least one property of at least some of the textiles-to-be-recycled.

Example A-84 may include the subject matter of any of Examples A-1 to A-83, and alternatively or additionally any other example herein, wherein the sorting is arranged to identify in the textiles-to-be-recycled at least one batch of cellulose materials, synthetic materials, protein materials, or blended materials.

Example A-85 may include the subject matter of any of Examples A-1 to A-84, and alternatively or additionally any other example herein, wherein the sorting is arranged to identify in the textiles-to-be-recycled at least one batch of cellulose materials and one batch of synthetic materials, protein materials, or blended materials.

Example A-86 may include the subject matter of any of Examples A-1 to A-85, and alternatively or additionally any other example herein, wherein the sorting is arranged to identify in the textiles-to-be-recycled at least one batch of materials that have been treated with fire retardants, water repellent chemicals, insecticides, or biological pathogen resistant chemicals.

Example A-87 may include the subject matter of any of Examples A-1 to A-86, and alternatively or additionally any other example herein, wherein the sorting is arranged to advance at least one batch of materials of the textiles-to-be-recycled for processing in a cellulose solvent reactor.

Example A-88 may include the subject matter of any of Examples A-1 to A-87, and alternatively or additionally any other example herein, wherein the sorting is arranged to advance at least one batch of materials of the textiles-to-be-recycled for non-cellulose material processing.

Example A-89 may include the subject matter of any of Examples A-1 to A-88, and alternatively or additionally any other example herein, wherein the re-sizing includes at least one of cutting, tearing, shredding, pulverizing, and grinding.

Example A-90 may include the subject matter of any of Examples A-1 to A-89, and alternatively or additionally any other example herein, wherein the re-sizing renders at least some of the textiles-to-be-recycled into at least one of pieces, clumps, clusters, particles, and a fine powder.

Example A-91 may include the subject matter of any of Examples A-1 to A-90, and alternatively or additionally any other example herein, wherein the re-sizing is arranged to produce pretreated materials having constituent elements, wherein most or all of the constituent elements of the pretreated materials have a nominal size of between about one hundred microns (100μ) and about one centimeter (1 cm).

Example A-92 may include the subject matter of any of Examples A-1 to A-91, and alternatively or additionally any other example herein, wherein the re-sizing is arranged to produce pretreated materials having constituent elements, wherein most or all of the constituent elements of the pretreated materials have a nominal size of less than about two hundred microns.

Example A-93 may include the subject matter of any of Examples A-1 to A-92, and alternatively or additionally any other example herein, wherein the re-sizing is arranged to produce pretreated materials having constituent elements, wherein most or all of the constituent elements of the pretreated materials have a nominal size of less than about one hundred microns (100μ).

Example A-94 may include the subject matter of any of Examples A-1 to A-93, and alternatively or additionally any other example herein, wherein the re-sizing is arranged to produce pretreated materials having constituent elements, wherein most or all of the constituent elements of the pretreated materials have a nominal size of more than about one square centimeter (1 sq. cm).

Example A-95 may include the subject matter of any of Examples A-1 to A-94, and alternatively or additionally any other example herein, wherein the re-sizing is arranged to produce pretreated materials having constituent elements, wherein most or all of the constituent elements of the pretreated materials are cellulose-based materials that are partially or completely separated from other materials, wherein the other materials include one or more of buttons, buckles, zippers, clasps, loops, rivets, wires, foam, rubber materials, and elastic materials.

Example A-96 may include the subject matter of any of Examples A-1 to A-95, and alternatively or additionally any other example herein, wherein at least some of the re-sizing is performed with a grinder.

Example A-97 may include the subject matter of any of Examples A-1 to A-96, and alternatively or additionally any other example herein, wherein at least some of the re-sizing is performed with a magnet.

Example A-98 may include the subject matter of any of Examples A-1 to A-97, and alternatively or additionally any other example herein, wherein at least some of the re-sizing is performed with an electrically charged surface.

Example A-99 may include the subject matter of any of Examples A-1 to A-98, and alternatively or additionally any other example herein, wherein at least some of the re-sizing is performed with air moving equipment.

Example A-100 may include the subject matter of any of Examples A-1 to A-99, and alternatively or additionally any other example herein, wherein the reactor chamber has a volume of between sixty-four fluid ounces (64 fl. oz.) and five gallons (5 gal.).

Example A-101 may include the subject matter of any of Examples A-1 to A-100, and alternatively or additionally any other example herein, wherein the reactor chamber has a volume of between five gallons (5 gal.) and five hundred gallons (500 gal.).

Example A-102 may include the subject matter of any of Examples A-1 to A-101, and alternatively or additionally any other example herein, wherein the reactor chamber has a volume of less than sixty-four fluid ounces (64 fl. oz).

Example A-103 may include the subject matter of any of Examples A-1 to A-102, and alternatively or additionally any other example herein, wherein the reactor chamber has a volume of more than five hundred gallons (500 gal.).

Example A-104 may include the subject matter of any of Examples A-2 to A-103, and alternatively or additionally any other example herein, wherein the synthetic fiber material is at least one of polyester, nylon, acrylic, and polyolefin.

Example A-105 may include the subject matter of any of Examples A-1 to A-104, and alternatively or additionally any other example herein, wherein the cellulose fibers are at least one of cotton, linen, rayon, hemp, jute fibers, lyocell, bamboo, and reed.

Example A-106 may include the subject matter of any of Examples A-1 to A-105, and alternatively or additionally any other example herein, wherein the cellulose-bearing solution has a concentration of more than one half of one percent (0.5%) cellulose fibers.

Example A-107 may include the subject matter of any of Examples A-1 to A-106, and alternatively or additionally any other example herein, wherein the cellulose-bearing solution has a concentration of about one to two percent (1-2%) cellulose fibers.

Example A-108 may include the subject matter of any of Examples A-1 to A-107, and alternatively or additionally any other example herein, wherein the cellulose-bearing solution has a concentration of more than two percent (2%) cellulose fibers.

Example A-109 may include the subject matter of any of Examples A-1 to A-108, and alternatively or additionally any other example herein, wherein the cellulose-bearing solution has a concentration of less than five percent (5%), less than ten percent (10%), less than twenty-five percent (25%), less than fifty percent (50%), or some other percentage less than one hundred percent (100%) cellulose fibers.

Example A-110 may include the subject matter of any of Examples A-1 to A-109, and alternatively or additionally any other example herein, wherein the cellulose-bearing solution has a concentration of about fifteen to seventeen percent (15-17%) cellulose fibers.

Example A-111 may include the subject matter of any of Examples A-1 to A-110, and alternatively or additionally any other example herein, wherein the cellulose-bearing solution has a concentration of more than five percent (5%), more than ten percent (10%), more than twenty-five percent (25%), or more than fifty percent (50%) cellulose fibers.

Example A-112 may include the subject matter of any of Examples A-1 to A-111, and alternatively or additionally any other example herein, wherein the coagulation bath reservoir includes water.

Example A-113 may include the subject matter of any of Examples A-1 to A-112, and alternatively or additionally any other example herein, wherein the coagulation bath reservoir includes deionized water.

Example A-114 may include the subject matter of any of Examples A-1 to A-113, and alternatively or additionally any other example herein, wherein the wet-spinning forms at least some of the coagulated cellulose fibers into a second continuous cellulose filament, the second continuous cellulose filament different from the continuous cellulose filament.

Example A-115 may include the subject matter of any of Examples A-1 to A-114, and alternatively or additionally any other example herein, wherein the continuous cellulose thread is commercially indistinguishable from a thread formed of virgin fibers.

The various embodiments described above can be combined to provide further embodiments. Various features of the embodiments are optional, and, features of one embodiment may be suitably combined with other embodiments. Aspects of the embodiments can be modified, if necessary to employ concepts of the various patents, application and publications to provide yet further embodiments.

The various embodiments described above can be combined to provide further embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

The invention claimed is:

1. A textile recycling method, comprising:
receiving textiles-to-be-recycled, the textiles to be recycled having at least some cellulose-containing articles;
sorting the textiles-to-be-recycled to isolate the cellulose-containing articles from non-cellulose-containing articles;
sorting the textiles-to-be-recycled to isolate a second type of cellulose-containing articles, wherein the cellulose-containing articles have a first type of cellulose fiber and the second type of cellulose-containing articles have a second type of cellulose fiber, the first type of cellulose fiber being different from the second type of cellulose fiber;
re-sizing at least some of the cellulose-containing articles to create a first feedstock;
re-sizing at least some of the second type of cellulose-containing articles to create a second feedstock;
processing the first feedstock in a first cellulose solvent reactor having at least one first ionic liquid therein to create a first spinning dope, wherein the processing includes dissolving, at least partially, some or all intermolecular cellulose bonds of the first feedstock thereby creating a first cellulose-bearing solution having first cellulose fibers dissolved in the at least one first ionic liquid;

processing the second feedstock in a second cellulose solvent reactor having at least one second ionic liquid therein to create a second spinning dope, wherein processing the second feedstock includes dissolving, at least partially, some or all intermolecular cellulose bonds of the second feedstock thereby creating a second cellulose-bearing solution having second cellulose fibers dissolved in the at least one second ionic liquid;

extracting the first spinning dope in a first cellulose coagulation bath reservoir to reconstitute at least some of the dissolved first cellulose fibers; and extracting the second spinning dope in a second cellulose coagulation bath reservoir to reconstitute at least some of the dissolved second cellulose fibers;

wet-spinning at least some of the reconstituted first cellulose fibers into a continuous cellulose thread; and wet-spinning at least some of the reconstituted first cellulose fibers with at least some of the reconstituted second cellulose fibers into a continuous cellulose hybrid thread.

2. The method of claim 1, further comprising:
vacuum-extracting or mechanically filtering insoluble materials from the first cellulose solvent reactor;
separating synthetic fiber material from the insoluble materials; and
recycling the synthetic fiber material into a continuous synthetic thread.

3. The method of claim 1, further comprising:
adding at least one material to the first feedstock, the material being at least one of a dye, an inert identification chemical, a water repellent, and a flame retardant.

4. The method of claim 1, further comprising:
adding at least one material to the first coagulation bath reservoir, the material being at least one of a dye, an inert identification chemical, a water repellent, and a flame retardant.

5. The method of claim 1, further comprising:
based on the sorting, directing operation of at least one conveyor, gate, pump, valve, fan, motor, suction, filter, or timer.

6. The method of claim 1, further comprising:
based on the sorting, directing operation of at least one electronically controllable circuit.

7. The method of claim 6, further comprising:
initializing a computing controller, the computing controller arranged to direct operations of the textile recycling method.

8. The method of claim 1 wherein the first cellulose solvent reactor is arranged as a plurality of reaction vessels and wherein processing the first feedstock includes receiving a portion of the first feedstock in each of the plurality of reaction vessels and creating a portion of the first spinning dope in each of the plurality of reaction vessels.

9. A textile recycling system, comprising:
a textile preprocessing structure arranged to:
receive textiles-to-be-recycled, the textiles to be recycled having cellulose-containing articles and non-cellulose-containing articles;
sort the textiles-to-be-recycled to isolate a first type of cellulose-containing articles from the non-cellulose-containing articles;
sort the textiles-to-be-recycled to isolate a second type of cellulose-containing articles from the non-cellulose-containing articles, wherein the first type of cellulose-containing articles have a first type of cellulose fiber and the second type of cellulose-containing articles have a second type of cellulose fiber, the first type of cellulose fiber being different from the second type of cellulose fiber;
re-size at least some of the first cellulose-containing articles to create a first feedstock;
re-size at least some of the second type of cellulose-containing articles to create a second feedstock;
a first cellulose-solvent reactor arranged to receive the first feedstock and at least one first ionic liquid and further arranged to create a first spinning dope from the first feedstock and the at least one first ionic liquid by dissolving, at least partially, some or all intermolecular cellulose bonds of the first feedstock thereby creating a first cellulose-bearing solution having first cellulose fibers dissolved in the at least one first ionic liquid;
a second cellulose-solvent reactor arranged to receive the second feedstock and at least one second ionic liquid and further arranged to create a second spinning dope from the second feedstock and at least one second ionic liquid by dissolving, at least partially, some or all intermolecular cellulose bonds of the second feedstock thereby creating a second cellulose-bearing solution having second cellulose fibers dissolved in the at least one second ionic liquid;
a first cellulose coagulation bath reservoir arranged to receive the first cellulose-bearing solution and further arranged to extract the first spinning dope by reconstituting at least some of the dissolved first cellulose fibers;
a second cellulose coagulation bath reservoir arranged to receive the second cellulose-bearing solution and further arranged to extract the second spinning dope by reconstituting at least some of the dissolved second cellulose fibers; and
a wet spinning spinneret subsystem arranged to wet-spin at least some of the reconstituted first cellulose fibers with at least some of the reconstituted second cellulose fibers into a continuous cellulose hybrid thread.

10. The system of claim 9, further comprising:
a vacuum-extraction or mechanical filter subsystem arranged to withdraw insoluble materials from the first cellulose solvent reactor.

11. The system of claim 9, further comprising:
a controller arranged direct operations of the first cellulose solvent reactor.

12. The system of claim 9, wherein the first cellulose-solvent reactor further comprises:
a plurality of reaction vessels arranged for concurrent operation, wherein each of the plurality of reaction vessels is arranged to receive a portion of the first feedstock and further arranged to create a portion of the first spinning dope.

13. The system of claim 9 wherein each of the plurality of reaction vessels operates independently from others of the plurality of reaction vessels.

14. A cellulose-solvent reactor, comprising:
a first vessel arranged to contain a first flowable feedstock slurry formed of ionic liquid and first cellulose-containing feedstock;
a second vessel arranged to contain a second flowable feedstock slurry formed of ionic liquid and second cellulose-containing feedstock;

a control system arranged to determine a cellulose concentration of the first and second flowable feedstock slurries;

at least one transducer coupled to the control system and arranged to output electromagnetic energy into the first and second vessels;

at least one sensor coupled to the control system and arranged to provide data indicative of how much electromagnetic energy from the at least one transducer has passed through the first and second flowable feedstock slurries, and an output port formed in the first or second vessel, the output port arranged to provide a first or second spinning dope to a coagulation bath, wherein the first or second spinning dope is formed when some or all intermolecular cellulose bonds of one or both of the flowable feedstock slurries are dissolved as cellulose fibers in the ionic liquid.

15. The cellulose-solvent reactor of claim 14, further comprising:
a heating circuit arranged to heat the first flowable feedstock slurry in the first vessel.

16. The cellulose-solvent reactor of claim 14, further comprising:
an agitation structure arranged to agitate the first flowable feedstock slurry in the first vessel.

17. The cellulose-solvent reactor of claim 14, further comprising:
one or more reaction probes partially or completely arranged in the first vessel, the one or more reaction probes arranged to generate at least one of pressure data, temperature data, and conductivity data indicative of the cellulose concentration of the first flowable feedstock slurry.

18. The cellulose-solvent reactor of claim 14, further comprising:
a plurality of reaction vessels arranged for concurrent operation, wherein each of the plurality of reaction vessels is arranged to receive a portion of one or both of the first and second flowable feedstock slurries and further arranged to create a portion of the first or second spinning dope.

19. The method of claim 1, further comprising:
after extracting at least some of the spinning dope, recovering some or all of the at least one first ionic liquid.

* * * * *